United States Patent [19]

Gorgone et al.

[11] 4,348,656

[45] Sep. 7, 1982

[54] SECURITY VALIDATOR

[75] Inventors: Robert L. Gorgone, Mentor; Gerald M. Iannadrea, Painesville; Anthony H. Dolejs, Bedford Heights; Bruce R. Knox, Wickliffe; Alan J. Kovach, Cleveland, all of Ohio

[73] Assignee: Ardac, Inc., Willoughby, Ohio

[21] Appl. No.: 85,394

[22] Filed: Oct. 16, 1979

[51] Int. Cl.[3] .............................................. G06K 9/00

[52] U.S. Cl. ............................ 340/146.3 R; 194/4 R; 209/534; 235/474; 235/475

[58] Field of Search ............... 235/474, 476, 477, 480, 235/475; 340/146.3 Q, 149 A, 146.3 R; 403/383; 194/4 R; 209/534; 250/556; 271/184

[56] References Cited

U.S. PATENT DOCUMENTS

| | | | |
|---|---|---|---|
| 3,076,599 | 2/1963 | Smith | 235/474 |
| 3,077,983 | 2/1963 | Middleditch | 209/534 |
| 3,419,724 | 12/1968 | Bayha | 250/556 |
| 3,558,860 | 1/1971 | Bauldreay et al. | 235/474 |
| 3,589,514 | 6/1971 | Townsend | 209/534 |
| 3,590,992 | 7/1971 | Soderstrom | 209/534 |
| 3,656,615 | 4/1972 | Ptacek | 209/534 |
| 3,706,374 | 12/1972 | Ptacek | 209/534 |
| 3,725,667 | 4/1973 | Schwartz | 209/534 |
| 3,924,847 | 12/1975 | Pescetto | 194/4 R |
| 4,025,210 | 5/1977 | Johnson | 403/383 |
| 4,041,456 | 8/1977 | Ott et al. | 340/146.3 R |
| 4,096,991 | 6/1978 | Iguchi | 235/480 |
| 4,176,783 | 12/1979 | Eppich | 235/474 |
| 4,179,685 | 12/1979 | O'Maley | 209/534 |

*Primary Examiner*—Leo H. Boudreau

*Attorney, Agent, or Firm*—Oldham, Oldham, Hudak & Weber Co.

[57] ABSTRACT

In the field of security validators, slot acceptors have been known which transport paper offered as a valid security past a testing station. Previously known acceptors have been susceptible to defeat by mosaics, stringing, shocking, photocopy duplication, and the like. Additionally, known acceptors have operated in an analog mode, relying uon rudimentary test functions. The invention herein overcomes the problems of the prior art by presenting an acceptor having a note path (18) characterized by changes of direction (22,24), and which is secured at each end by means of unique gate assemblies (78,98). A plurality of sensors (148-152) are positioned along the note path and are controlled to take a multitude of data samples from the paper as it passes along the path. The data is digitized (236) and used for solving complex transforms, the results of which are compared against results obtained from known valid securities to determine the authenticity of the paper offered. Further, the system includes a unique anti-jamming technique of drive motor reversals, and an escrow feature which secures the paper once it has been determined to be authentic and before a vend has been made. Yet further, there is included a novel receptacle for receipt and return of paper offered to the acceptor, and a number of variations of anti-stringing devices (112, 114, 118, 130) which may be operatively positioned at the end of the note path.

33 Claims, 31 Drawing Figures

FIG. 4
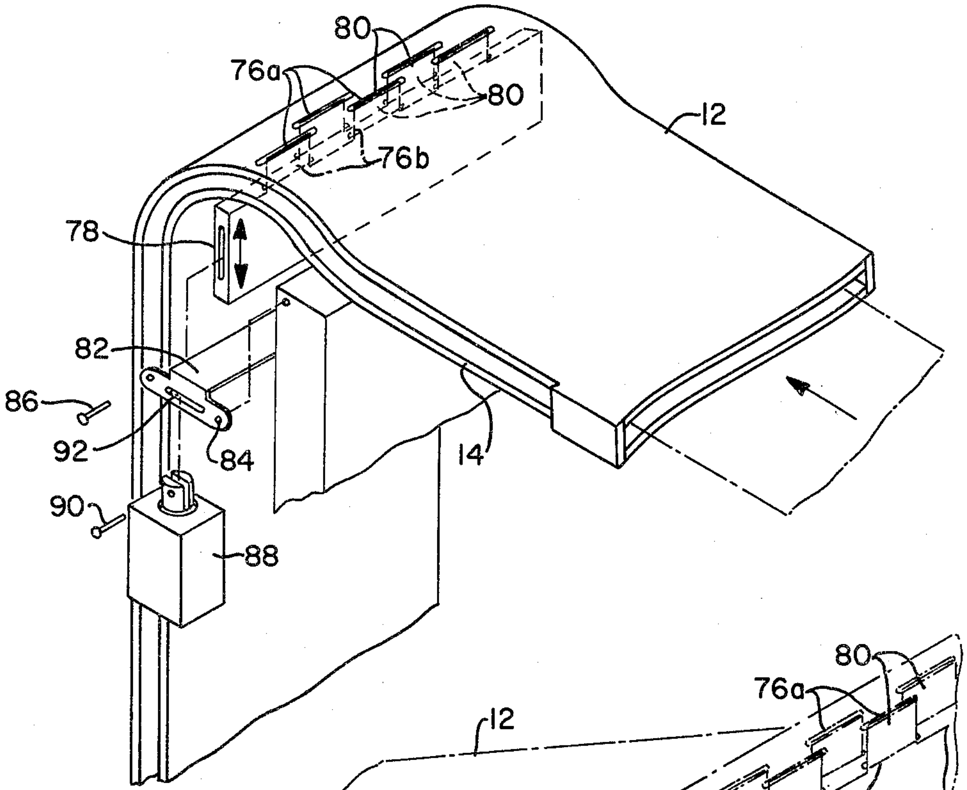
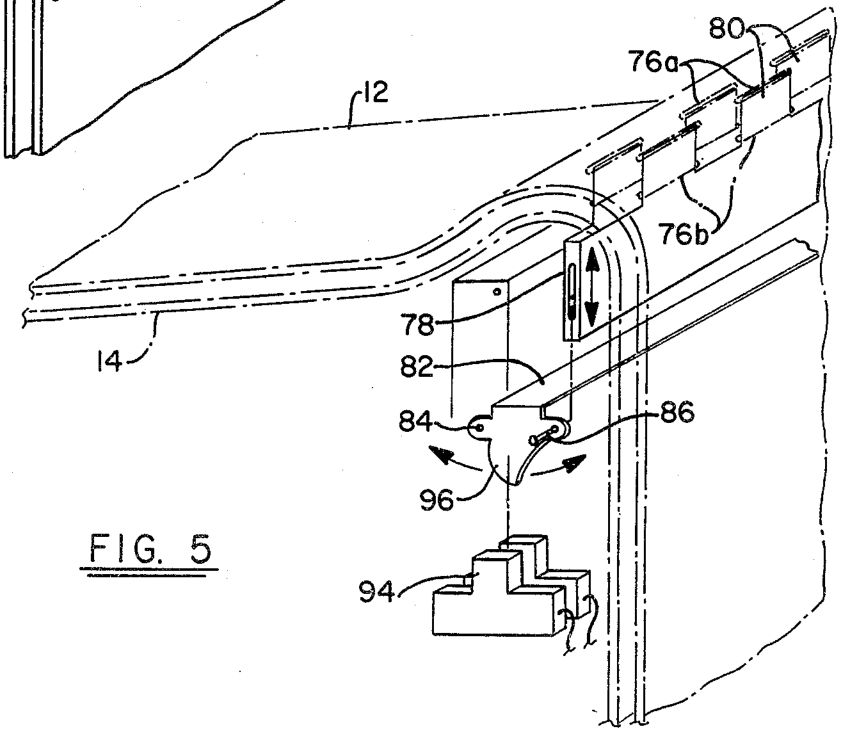
FIG. 5

FIG. 6
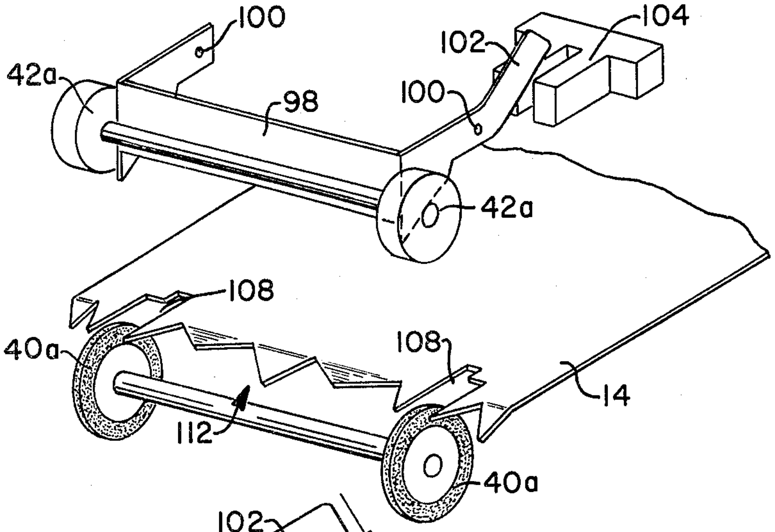
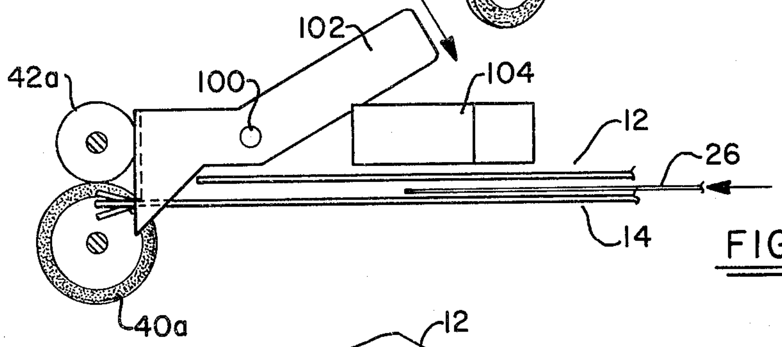
FIG. 7
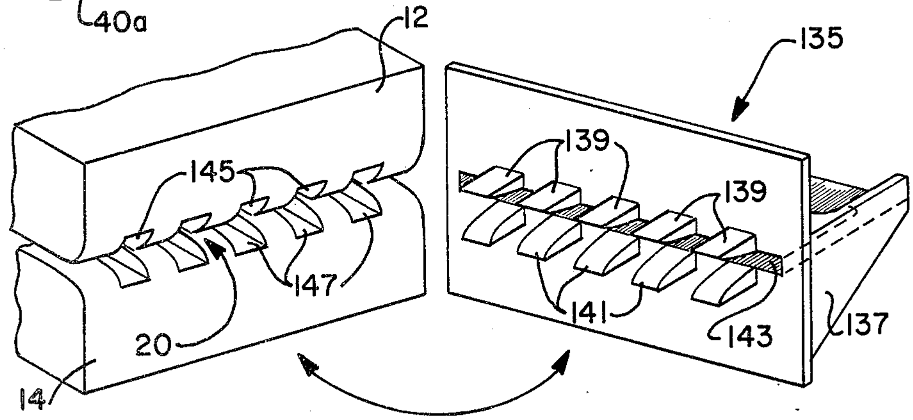
FIG. 11A

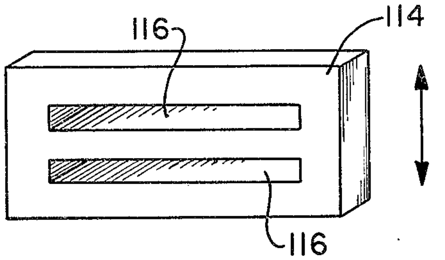
FIG.-8
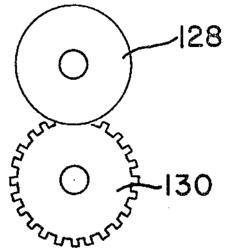
FIG.-10
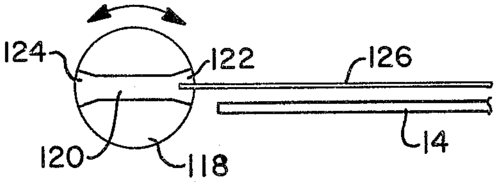
FIG.-9
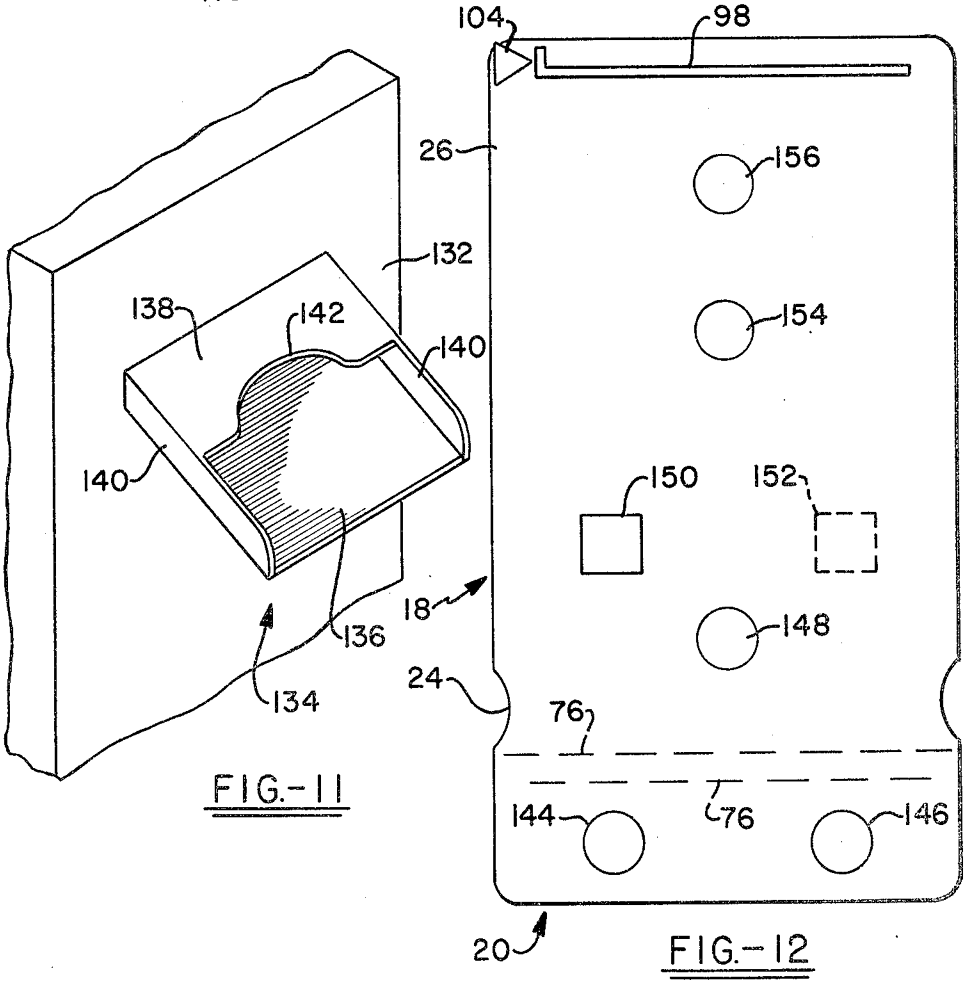
FIG.-11
FIG.-12

PIAØ
PB0
PB1
PB3
PB4
PB5
PA1, PIA1
PA5, PIA1
PA6, PIA1
CA2, PIA1
IRQ
C PE
0
+V
+V1
+V2
M
28
66
72
74
94
104
144
146
154
156
158
160
162
164
166
168
170
172
174
176
178
180
182
184
186
188
190
192
194

SECURITY VALIDATOR

BACKGROUND OF THE INVENTION

The instant invention resides in the art of validating apparatus and, more particularly, a device which may be used for determining the authenticity of paper money, bank notes, stocks, bonds, and the like. There are presently two known types of such apparatus, designated tray acceptors and slot acceptors, the former receiving the paper money or other security in a tray which is moved to a test position with the security being held stationary during the tests for validity. In such previous known tray acceptors, an optical scanner including a reticle or grid is caused to move across a portion of the security to effect intermittent matching between the reticle and a pattern on the security. Such matching is sensed by an optical sensor which produces an electrical output signal indicative of the validity or invalidity of the paper tendered.

While tray acceptors have been well received in the art, and have provided substantially reliable service, certain disadvantages of such tray acceptors have become apparent. Particularly, the validation test conducted in a tray acceptor generally includes a sensor or reticle which is mechanically moved across the paper a very short distance such that the extent of the test is very limited not only with respect to the actual parameters tested, but also with respect to the fact that only a single area on the paper is being tested. To provide multiple tests in order to defeat photocopies of authentic paper presently known tray acceptors would need to include extremely complex mechanical linkages or a plurality of scanning devices, both alternatives increasing system cost and reducing system reliability.

The instant invention relates to a slot acceptor which, contrary to the previously known tray acceptors, moves the paper past a testing position or positions such that a single sensing system may view plural points on the paper. Slot acceptors can provide multiple tests with only a modest increase in system complexity and are more efficient and reliable in operation since less repair and maintenance is required.

With respect to note acceptors in general, there are a number of typical problems encountered at the hands of those who would seek to either fool the acceptor into believing it has received an authentic paper when, indeed, it has not or who would seek to retrieve the authentic paper after receiving credit from the acceptor for having deposited the paper.

A first problem characteristic of note acceptors is that known as "stringing." In this situation a string or wire is attached to the note when it is deposited in the acceptor and the note is then retrieved via the string or wire after the acceptor has determined the note is authentic and has appropriately credited the depositor with change or goods. It is known that all presently existing acceptors may be "strung." In slot acceptors a valid paper is deposited and the credit issued by the machine is used. The string is used to pull the note back into engagement with the roller used for transporting the paper through the testing path. A second invalid paper is then deposited into the acceptor and when the rollers begin to run in the reverse direction to return the invalid paper the authentic note, previously deposited, is retrieved via the string and roller to the depositor.

Another type of problem which acceptors must overcome is that of determining authentic papers from facsimiles produced by modern photocopy methods. Today, with photocopy machines being capable of producing colored copies of high resolution, sophisticated tests must be provided to guard against the acceptance of a photocopy as a valid paper. The mere utilization of a small duplicity of tests relying on transmission or reflectance of particular spectral wave lengths is no longer sufficient, nor is the utilization of pattern-matching techniques alone.

In the past, persons have also sought to defeat existing note acceptors by use of "mosaics." These mosaics are comprised of small pieces of a valid paper cut from different notes to build a composite which might fool the acceptor. The papers from which the pieces for the mosaic are taken may generally be redeemed from a bank. Often, these mosaics appear to be authentic in the areas to be tested by the acceptor and, since the tested portion of the paper offered to the acceptor is, indeed, authentic, the acceptor will credit the offeror with having deposited a valid paper.

Yet another known approach to defeating existing acceptors is that of "shocking" the machine by physically jarring it in order that a noise signal might be generated. The general approach in this regard is to jar the contacts of a relay closed in order to obtain a vend signal. In slot acceptors where the sensor is fixed and there are a minimum of mechanically moving parts, the susceptibility of the acceptor to "shocking" is minimized.

Other problems inherent in the prior art include the general inability of present validators to obtain a profile of the document offered as a note or other security, relying solely upon one or more individual tests on preselected areas of the document. Such tests do not provide a thorough examination of the paper and are thus susceptible to fraudulent offerings.

Additionally, existing validation apparatus has generally operated in an analog mode, relying upon rudimentary test functions. There are no known acceptors which rely upon a validation transform or equation which is an aggregate of a large number of individual tests wherein the deviation or error of each test is amplified. By operating in a digital mode, a complex validation equation may be used which increases the ability of the validator to discern between valid and invalid papers.

OBJECTS OF THE INVENTION

In light of the foregoing, it is an object of the instant invention to provide a paper security slot acceptor apparatus which includes means for preventing the defeat of the apparatus by stringing.

Yet another object of the invention is to provide a paper security slot acceptor apparatus which exceeds the ability of previously known acceptors to discern valid securities from copies, mosaics, and other facsimilies.

Still another object of the invention is to provide a paper security slot acceptor apparatus which is less susceptible to defeat by shocking than previously known acceptors.

Yet a further object of the invention is to provide a paper security slot acceptor apparatus which incorporates testing means adapted for obtaining a profile of the paper offered as a security rather than testing only a few selected portions thereof.

Still another object of the invention is to provide a paper security slot acceptor apparatus which operates in a digital mode and includes means for utilizing complex mathematical transforms for determining the authenticity of the paper tendered.

Still a further object of the invention is to provide a paper security slot acceptor apparatus which may be programmed to test for the validity of any of a number of securities and which may test for such validity irrespective of the manner in which the paper is tendered to the apparatus.

Yet another object of the invention is to provide a paper security slot acceptor apparatus which is capable of securedly retaining a paper following the determination of its validity and prior to acceptance by the user of a credit given therefor.

An additional object of the invention is to provide a paper security slot acceptor which is substantially jam proof.

Another object of the invention is to provide a paper security slot acceptor wherein the note path is easily accessible for cleaning and servicing.

A further object of the invention is to provide a paper security slot acceptor which includes means for determining the authenticity of a paper security by comparing test values obtained from an offered paper to stored average values obtained by statistical analysis of a plurality of valid securities.

Yet another object of the invention is to provide a paper security slot acceptor which includes means for automatically adjusting the outputs of the sensors thereof to compensate for aging, light and voltage variations, and the like.

Still an additional object of the invention is to provide a paper security slot acceptor which includes means for monitoring the instantaneous position of the paper along the note path of the acceptor irrespective of changes in voltage to the drive motor or changes in drive motor speed.

Still a further object of the invention is to provide a paper security slot acceptor apparatus which is reliable in operation, flexibly adaptable for use in any of a number of acceptor arrangements, and readily conducive to implementation using presently existing elements and with presently existing vending machines.

SUMMARY OF THE INVENTION

The foregoing and other objects of the invention which will become apparent as the detailed description proceeds are achieved by: a note acceptor for receiving and determining the authenticity of a paper security such as a currency, bank note, or the like, comprising: top and bottom plates defining a note path therebetween for receiving a paper offered as a valid security; paired top and bottom rollers respectively received by said top and bottom plates in contacting engagement within said note path; drive means connected to and driving said bottom rollers; sensing means interposed along said note path between said top and bottom plates for acquiring data from specific areas on said paper as it passes along said path; control means interconnecting said drive means and said sensing means for synchronizing the passing of said paper along said note path and the acquisition of data therefrom; and comparison means operatively connected to and receiving said data from said sensing means and determining the validity of the paper as a function of the difference between said data and reference values obtained from a plurality of valid securities.

Further objects of the invention are achieved by: the method of determining the authenticity of a paper offered as a valid security, comprising: scanning said paper along at least a first path and obtaining a plurality of test data at preselected points on said paper along said first path; comparing said plurality of data with average values of data taken from known valid securities at said points; and accepting said paper as a valid security if the difference between said test data and said average values is within a predetermined range.

DESCRIPTION OF THE DRAWINGS

For a complete understanding of the objects, techniques, and structure of the invention reference should be had to the following detailed description and accompanying drawings wherein:

FIG. 4 is a partially sectioned illustrative assembly drawing of the conveyor assembly of FIG. 1 showing the operative interconnection of the front gate therewith;

FIG. 5 is an illustrative assembly drawing of the front gate assembly and actuation mechanism;

FIG. 6 is an illustrative assembly drawing of the rear gate of the conveyor assembly, showing its positional relationship with the rear antistringing tines;

FIG. 7 is an illustrative side view of the end of the conveyor assembly showing the operative relationship between the rear rollers, rear gate, tine assembly, and note path;

FIG. 8 is a perspective view of a reciprocating rear passage maintained at the end of the note path as an anti-stringing device;

FIG. 9 is an illustrative side plan view of a rotatable drum maintained at the end of the note path as an anti-stringing device;

FIG. 10 is an end plan view of a gripping roller in contact with a resilient roller to be maintained at the end of a note path as an anti-stringing device;

FIGS. 11 and 11A are perspective views of the slot lips of the invention, facilitating insertion of notes into the slots;

FIG. 12 is a top illustrative view of the note path of FIG. 1, showing the positional relationships of various sensors and securing apparatus therealong;

FIG. 13, comprising

FIG. 15, comprising

DETAILED DESCRIPTION OF PREFERRED EMBODIMENT

Figure 1:
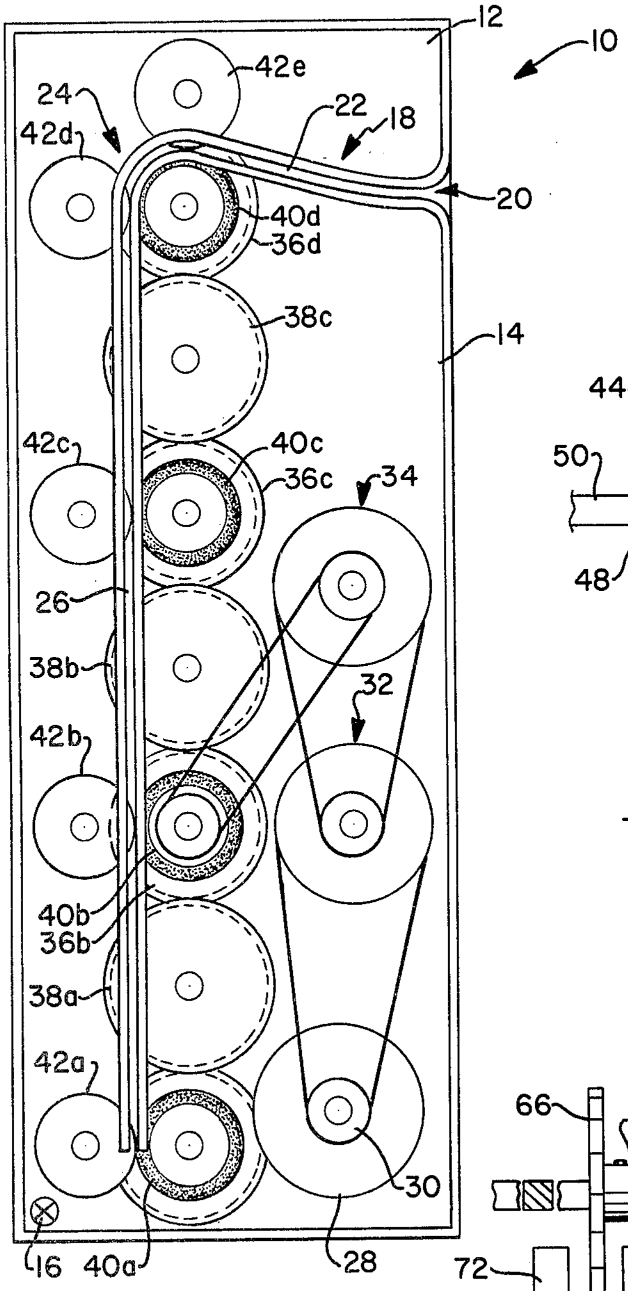
FIG. 1 is an illustrative side view of the conveyor assembly of the invention.

Referring now to the drawings and more particularly FIG. 1, it can be seen that the conveyor assembly of the invention is designated generally by the numeral 10. This assembly includes a top 12 hingedly connected to a base 14 by means of a hinged panel or other suitable pivotal means 16. The top 12 and base 14 are preferably of metal or durable plastic construction and are pivotally interconnected to allow the top 12 to swing free of the base 14, exposing a note path 18 defined therebetween for cleaning, servicing, and the like.

It will be appreciated that the conveyor assembly 10 is received within the housing of a note acceptor or other validator. A horizontal receiving slot 20 is provided in a front edge of the assembly 10 and is in registration with a slit or other opening in such housing. The receiving slot 20 extends horizontally to a inclined portion 22 of the path 18. The portion 22 is oblique with respect to the receiving slot and rises upwardly to prevent or restrict foreign materials from entering the slot and passing upward to the roller mechanisms to be discussed hereinafter. The inclined path section 22 bends into an arc 24 with the arc preferably being greater than 90°. The path 18 extends through the arc 24 to a vertical portion 26 which is open at the bottom thereof to communicate with a box, stacker, or other appropriate note receiving means (not shown).

A motor 28 is secured to the base 14 and includes a hub or pulley wheel 30 in operative interconnection with the pulley assemblies 32,34. These pulley assemblies are operative to drive a gear train 36,38 which is similarly connected to the base 14. It will be understood that the drive and pulley assemblies 30–34 could be comprised of gears and gear belts to prevent slippage between rotational movement of the motor 28 and resultant movement of the gear train 36,38.

The gear train referenced above comprises drive gears 36*a–d* with the drive gear 36*b* being driven by the pulley 34. Interposed between and in meshing interengagement with the drive gears 36*a–d* are the idler gears 38*a–c* to round out the gear train in proper spaced relationship. It will also be noted that a plurality of driven rollers 40*a–d* are connected to common axles with the associated drive gear 36*a–d*, such axles being rotatably received by the base 14 in a manner to be discussed hereinafter.

Interconnected to the top 12 by pins, axles, or other appropriate means, are spring-loaded idler rollers 42*a–e*. These rollers are maintained in contacting driven engagement with the rollers 40 and make such engagement within the note path 18 as shown. It will be appreciated that each of the rollers 42*a–e* and 40*a–d* represent two such rollers equally spaced across the width of the note path such that a total of ten note-driving points are maintained within the path. It will further be appreciated that the rollers 40 preferably include rubber O-rings in contacting engagement with the plastic rollers 42. Further, the roller 40*d* provides a dual function in contacting engagement with both of the rollers 42*d–e* at the arc 24 of the note path 18 to assist a note in traveling about such arc.

With final reference to FIG. 1, it should be appreciated that the note path 18 makes a change of direction at the inclined portion 22 with a subsequent substantial change of direction at the arc 24, with that arc preferably exceeding 90°. The changes of direction in the note path make stringing of the machine a difficult proposition, discouraging such fradulent activity. These changes in path direction also make it extremely difficult for one to insert a semi-rigid card or sheet into the note path to defeat gates and the like of the nature to be discussed hereinafter. Additionally, the changes in the note path, going from horizontal to vertical, facilitate packaging of the conveyor system 10 in an acceptor of minimum depth while the vertical discharge area at the end of the path allows gravity to facilitate depositing of accepted paper into appropriate receiving means.

Figure 2:
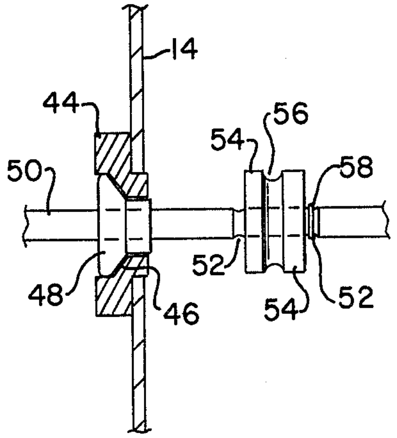
FIG. 2 is a partial sectional view of a roller assembly of the type used in FIG. 1.

With reference now to FIG. 2, the method and structure of the assemblage of the driven rollers 40 may be seen. A race member 44 is received by each side of the base 14 in a hole drilled therein. The race member 44 is characterized by a conical race 46 comprising the internal surface thereof which is adapted for receiving a conical bearing 48. A square shaft 50, being a driven shaft connected to one of the driven gears 36, passes through the bearing 48 and is characterized by spaced circular seats 52 machined thereabout. Received upon the square shaft 50 between the seats 52 is a hub comprised of two identical hub forms 54 which are preferably molded of plastic and snap fit or cemented together. Of course, the forms 54 have square holes centrally passing therethrough for reception of the shaft 50, with the hub being maintained on the shaft by appropriate keepers or "E-rings" 58 received by the seats 52. The assemblage of FIG. 2 allows the rollers 40 to be assembled without the need of drilling and pinning a circular shaft. The use of the square shaft further guarantees responsive movement of the wheel 40 with the shaft and does not allow for any slippage thereof.

Figure 3:
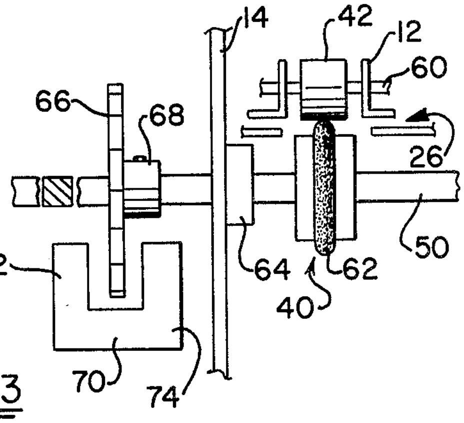
FIG. 3 is a partial sectional view of the motor driven shaft of the conveyor assembly, having connected thereto a synchronous light chopper.

As will be appreciated hereinafter, it is important for the technique of the invention that the position of a paper tendered as being authentic be known at any point during its travel along the path 26. In FIG. 3 it may be seen that the spring-loaded idler roller 42 is maintained by the top 12 of the conveyor assembly 10 by means of a pin or other axle 60. It is further seen that the wheel 40 is formed by placing a rubber O-ring 62 within the groove 56 defined by the interconnected hub pieces 54. The rubber O-ring makes contacting engagement with the spring loaded roller 42 within the note path 26.

As is further noted from FIG. 3, the shaft 50 is mounted via a suitable bearing 64 as described in detail with respect to FIG. 2 and is rotatable therewithin. Connected to the shaft 50 opposite the base 14 is a chopper wheel 66 comprised of a plurality of symmetrically spaced vanes. The hub 68 is provided to interconnect the chopper 66 to the shaft 50 by means of a set screw of the like. A sensor 70, comprising a light source 72 and a photodetector 74 is operatively interconnected with the chopper 66 as shown. As the shaft 50 rotates, under direct or indirect control of the motor 28, the chopper 66 interrupts the light path from the source 72 to the detector 74 with the sensor 70 producing resultant output pulses. It will be understood that the frequency of such pulses will depend upon the rate of rotation of the shaft 50 and, accordingly, the rate of movement of the note through the path 26. Similarly, by counting such pulses one may determine at any point in time, associated with such count, the particular location of any area on the note as it travels through the path 26.

As discussed above, in a preferred embodiment of the invention the sensor 70 is a light source and sensor which is actuated by a chopper 66. The chopper 66 is preferably attached to either the motor 28 itself or to the shaft or axle of one of the drive gears 36. In such an embodiment, the motor 28 would be a high RPM motor, on the order of 5,000 rpm, and the chopper would have 12 vanes therein providing an output of 60,000 pulses per minute. This output signal, as will be discussed hereinafter, may then be divided to provide a one KHZ output, resulting in a high degree of accuracy respecting the note position.

Alternate arrangements may be provided for determining the instantaneous position of the note within the note path 26. For example, the chopper 66 and sensor 70 could comprise a gear and magnetic pick-up arrangement. Further, as shown in FIG. 3 the wheel 40 could be an idler wheel with the "O-ring" 62 being borne upon by a spring loaded idler wheel 42 within the note path 26. With both these wheels being free wheeling, when a note passes between the bight formed therebetween the wheel 40 would be caused to rotate and, accordingly, would effectuate the liquid chopping device 66–74 to produce the desired synchronous pulses. Yet further, it will be understood that the motor 28, used for driving the gear arrangement of FIG. 1, could be a synchronous motor or a motor with a tachometer attached thereto to achieve desired speed control. Of course, such a motor arrangement would comprise a control system of sorts and would require the necessary feedback circuitry to achieve the desired control.

With reference now to FIGS. 4 and 5, it can be seen that part of the security mechanism of the invention includes a gate arrangement which may allow a note to be securedly retained by the machine while a credit is given to the user for vending a product or the like. As shown, the gate assembly includes a plurality of slots 76*a*, 76*b* respectively positioned in the top and base portions of the conveyor assembly of FIG. 1. These slots are preferably chamfered so as not to interfere with movement of paper along the note path 26. While these slots may be positioned in any of a number of places, it is preferred that they are maintained at the beginning of the inclined path 22 as better shown in FIG. 1. Maintained within the base 14 is a gate 78 characterized by a plurality of spaced alternating teeth 80 adapted for reciprocating movement through the slots 76*a,b*. The gate 78 is connected at each end thereof to a linkage 82 by means of pins 86 or the like. Similarly, the ends of the linkage 82 are pivotally connected as at 84 to the base 14. A solenoid 88 is connected by a pin 90 to a slot 92 at one end of the linkage 82. The other end of the linkage is maintained in operative communication with a sensor 94 via the communication of a vane 96. The sensor 94 may be of similar nature to the sensor 70, including a light source and photodetector and producing an output characteristic of the state of actuation of the gate 78.

In operation, the gate apparatus of FIGS. 4 and 5 allows a note to be stored along the note path 26 for a short duration of time until the note is either collected by the conveyor assembly 10 or is returned to the depositor, depending upon what the customer chooses to do. The gate 78 is normally closed under control of either spring biasing or positive control of the plunger of the solenoid 88. In this posture, the teeth 80 extend through the slots 76 and block the note path. When a paper is tendered to the machine, sensors in front of the gate sense the presence of a paper and allow the gate to drop under control of the solenoid 88. The tendered paper is then passed through the conveyor system 10 to a test position along the straight note path 26. The detectors in this test area then determine if the paper is a valid security and, if so, the solenoid causes the gate to again go up with the teeth once again passing through the hole 76 and blocking the return note path. The note is then held in escrow, having been validated, until the user determines to use the credit which he has been given or requests that the note be returned. The sensor 94 is used to determine whether or not the gate is actually up or whether an attempt has been made via a piece of hard plastic or the like to prevent the gate from locking into the escrow position. A signal from the sensor 94 is used in the control circuitry in a manner which will be discussed hereinafter. In any event, it will be appreciated that the front gate assembly of FIGS. 4 and 5 prevents the retrieval of the paper security once it has been validated and the user has been authorized to use a credit given therefore.

As discussed above, "stringing" of acceptor machine is an on-going problem in the art of security validation. To prevent such attempts to defeat the integrity of the instant acceptor, the apparatus of FIGS. 6 and 7 is included at the end of the note path 26 as shown in FIG. 1. As can be seen, this structure includes a rear gate 98 which comprises a substantially straight piece of lightweight metal or plastic having a straight bottom edge adapted for resting upon the base 14 of the note path 26. The gate 98 is pivotally connected on each side thereof as at 100 to the sides of the base 14. This pivotal engagement allows the gate to open or close across the path 26 with the actuation of the gate being sensed by means of the vane 102 and sensor 104. Again, the sensor 104 typically includes a light source and photodetector. Also included as part and parcel of the gate 98 are two beveled or tapered cam surfaces 106 at each end thereof. The cam surfaces 106 are adapted to be received in the slots 108 of the base 14 and are provided to be actuated by the leading edge of a note passing along the path 26. The note impinges upon the surfaces 106 and lifts the gate 98 about the pivots 100 with the resultant actuation of the sensor 104 by the vane 102. Also provided in the base 14 are other slots 108 adapted for receiving the rear driven wheels 40*a*.

Along the back edge of the base plate 14 is a tine assembly 112 comprising a plurality of pointed teeth alternately bent upwards, downwards, or in alignment with the base 14. It is also contemplated that the teeth of the tine assembly 112 might have their edges sharpened to a razor edge for purposes of cutting strings or the like which might be used by those in an attempt to defeat the acceptor.

In operation, the structure of FIGS. 6 and 7 is actuated by a paper passing through the note path 26 which lifts the gate 98 via the cam surfaces 106. The vane 102 breaks the sensor 104 while the gate is lifted and the paper passes under the gate and into the bight between the driven rollers 40*a* and the spring loaded idler rollers 42*a*. This bight further removes the note from the path 26 to its point of final collection. Once the bill passes beyond the gate 98, the cam surfaces 106 are disengaged and the gate 98 closes. Should one then desire to retrieve the note, the teeth of the tine assembly 112, extending in three different directions, coupled with the closed gate 98, prevents such activity. Further, the control circuitry of the invention is connected such that a vend signal is issued to give the customer his requested product or service only after the assembly 102,104 indicates that the gate 98 has closed. Accordingly, the rear gate 98 and tine assembly 112 make the paper unretrievable after a vend has been authorized. It will be appreciated that the gate 98 is maintained in immediate juxtaposition to the tine assembly 112 such that the three-directional tine and the gate substantially comprise a single anti-stringing unit.

The tine assembly 114 might be replaced by other suitable means for preventing stringing of the acceptor. As shown in FIG. 8, the end of the note path 26 might be provided with a reciprocating block 114. This block is characterized by at least two slots 116 which pass therethrough. One of the slots 116 is aligned with the note path 26 immediately adjacent the rear gate 98. When a note is to be accepted and is caused to pass through the gate in the manner described above, it passes through the aligned slot 116 to the collection area. When the gate then recloses actuation of the sensor 104 may be used to control a solenoid or other appropriate control means to shift the position of the block 114 to align the other slot 116 with the path 26. Subsequent notes follow exactly the same procedure such that the notes alternate in passage through the two slots 116. If one has attached a string to the note, when the note is to be retrieved via the string the slot through which the string has passed is no longer aligned with the note path and such retrieval is thwarted.

In FIG. 9 yet another anti-stringing apparatus is shown as comprising a drum 118 having a slot 120 passing therethrough. The slot 120 is characterized by enlarged tapered openings 122,124 on each side thereof to facilitate receipt of a note 126 passing along the note path 26 to the end thereof. In operation, the note 126 passes through the slot 120 under drive of the wheels as discussed above. When the note clears the rear gate 98 the drum 118 is caused to rotate a predetermined amount, in increments of 180°. Thus if the first note entered through the opening 122 and exited via the opening 124, the next note would enter via 124 and exit via 122. The drum 118 may be caused to rotate reciprocatingly in arcs of 180° or may rotate in only one direction 180° at a time. In either event, the drum will then roll the string which has been attached to the note and if the drum 118 is prevented from free rolling in a reverse direction, as by gears, needle bearings, or mechanical linkage, the string which wraps around the drum 118 will be incapable of retrieving the note.

Finally, as shown in FIG. 10, the rear wheels 40*a*,42*a* could be substituted by resilient wheels 128 and a meshing wheel 130. In a preferred embodiment, the wheel 128 would be of soft rubber construction and the wheel 130 would have small teeth which would tend to distort the surface of the wheel 128, making tight gripping engagement with the note passing therebetween. Further, if the wheels 128,130 were to be rotatable in one direction, for example with the wheel 130 being a clutched wheel, then withdrawal of the note by stringing would be impossible.

As shown in FIG. 11 another aspect of the instant invention is the provision of a protruding receptacle 134 attached to the housing 132 of the conveyor or acceptor assembly. The receptacle 134 communicates with the horizontal receiving slot 20 of the conveyor assembly 10 and includes an escutcheon plate 136, a top plate 138, and two side plates 140 interconnecting the two. As can be seen, the top plate 138 is shorter than the base plate 136 and is housed out as at 142. This arrangement allows the user to place a note upon the escutcheon 136 and to use a finger or fingers to direct the note toward the slot 20. The entire protruding receptacle, being substantially encased, facilitates such insertion in an outdoor environment susceptible to gusts of wind and the like with the housed out portion 142 allowing the user to direct the front edge of the note immediately into the receiving slot 20. Further, by spacing the side plates 140 a distance approximately ½ inch greater than the width of a note, the receptacle 134 guarantees that the note is received by the slot in a well aligned manner such that the acceptor will not immediately reject the note due to misaligned insertion.

With reference now to FIG. 11A, it can be seen that a modified receptacle 135 may be used to replace the receptacle 134 just discussed. Again, a bottom escutcheon and a top plate similar in nature to that of FIG. 11 will be used. The top plate is housed out as at 142 to accommodate the user's fingers for proper placement of the bill. The receptacle 135, however, includes a side plate 137 of trapezoidal configuration which extends the length of the escutcheon to shield the note-receiving area from wind and other environmental perturbations.

The back plate of the receptacle 135 is characterized by upper and lower fingers 139,141. These fingers are respectively positioned above and below the opening 143, which opening is adapted to communicate with the slot 20 of the conveyor assembly 10. The fingers 139,141 are positioned opposite each other with respect to the opening 143 and are arcuately diverged from each other as they extend from the back plate of the receptacle 135. The fingers 139,141 are adapted to be respectively received wihin upper and lower slots 145,147 in the top 12 and base 14 of the assembly 10. As shown in FIG. 11A, the slots 145,147 are provided in the arcuate surfaces of the top 12 and base 14 which serve to define the note-receiving slot 20. When the fingers 139,141 are received by the corresponding slots 145,147, there is provided a narrow opening 143 in communication with the slot 20 for paper which is offered to the acceptor for validation. If the paper proves to be invalid and must be returned, the fingers 139,141 serve to provide a wide opening to receive the returned paper, which opening converges via the arcuate surfaces of the fingers 139,141 to the narrow opening 143. The finger and slot arrangement of FIG. 11*a* thus serves a multiple purpose. It allows the entrance slot to be of minimum heighth, thus restricting the insertion of plastic cards or the like into the acceptor, while providing a funnel-like return slot for paper rejected by the acceptor, this funneling technique substantially reducing the possibility of jamming the acceptor. Finally, the finger and slot arrangement shown reduces the need for precision alignment of the slot 143 of the receptacle 135 with the slot 20 of the conveyor assembly 10. This structure overcomes drawbacks previously inherent in slot acceptors.

With final reference to FIG. 11A, it is presented that it is preferred that the escutcheon 136 be slightly inclined to neck-down the opening 143 from an opening of relatively substantial height which can easily receive the paper tendered, to a very small heighth which would restrict the insertion of credit cards or the like.

With reference now to FIG. 12, the sensing and testing apparatus of the invention may be seen. Here the note path 18 is diagrammatically shown from the receiving slot 20 to the rear gate 98. As shown, two photodetectors 144,146 are positioned at the front edge of the receiving slot 20. These photodetectors are spaced apart at a width approximately equal to the width of a valid note. To provide for some alignment variances when the note is inserted into the slot 20, the sensors 144,146 may be spaced slightly less than the width of a valid note, for example, within ½ inch of such distance. In any event, the sensors 144,146 determine if the paper tendered as a valid note is within the appropriate range of that note's width and further act to sense the fact that a paper is, indeed, being offered at the slot 20. When the sensors 144,146 sense a paper of suitable width, a signal is emitted which causes the gate 76, described above, to be opened and the note is fed to the gears, wheels, and rollers discussed in association with FIG. 1. The note then passes across a photoscanner 148 which, upon sensing the leading edge of the paper, actuates a counter to begin counting the output pulses of the chopper-sensor assembly 66–74. Thus, actuation of the counter begins immediately at the leading edge of the paper and the count is synchronous with the movement of the paper along the path 26. It should be noted that the motor 28 was actuated by the sensing of the cells 144,146 when the paper was offered to the slot 20.

The photoscanner 148 also functions to sense the density of the paper being tendered along the profile of the paper as it passes thereunder. Density detectors are known in the art and a suitable such arrangement could be easily selected by one skilled therein. Also provided are sensors 150,152 respectively positioned above and below the note path 26. As shown, these sensors are spaced apart with respect to the sensor 148, but any suitable positioning of the sensors may be made, depending upon the areas of interest on the papers to be validated. Suffice it to say that the sensors 150,152 sense the optical characteristics of the note such as spectral transmission or reflectance of the light band width incident thereto. These latter two sensors inspect the paper itself, the ink thereon, and various pattern arrangements which may be existent. Again, suitable sensors of this nature would be well known to those skilled in the art and generally include a light source emitting light of a particular wave length or band width of wave lengths with a sensor being appropriately positioned to sense the light which is reflected or transmitted by the paper at certain areas therealong. Of course, a reticle or grid network might be interposed between the light source and sensor for masking or pattern matching techniques.

Photodetector 154 is provided as shown for the principal purpose of determining whether or not the paper offered is too short to comprise a valid note. If the sensor 154 is covered while the sensors 144,146 are uncovered, the paper is too short to be a valid note. Similarly, the detector 156 is interposed in the path 26 to determine if the paper is too long to comprise a valid note. If the sensors 144,146 and 156 are all simultaneously covered then the paper is too long to comprise a valid note. It will, of course, be appreciated that the positioning of the sensors 154 and 156 will be determine by the particular notes being sensed by the apparatus under consideration.

Finally, with respect to FIG. 12, a sensor 104 in operative communication with the rear gate 98 senses when a note has actually passed from the testing or escrow area 26 to the collection area.

An important feature of the instant invention is the technique by which a determination is made from the data acquired by the sensors and detectors 148–152 as to the authenticity of the note. Heretofore in the art very rudimentary techniques have been utilized which basically included a testing of amplitude, frequency, or number of pulses emitted from the sensor. The instant invention contemplates a far more sophisticated approach toward the validation test by utilizing test equations which are highly sensitive to any acquired data which is out of the range of that which might be acquired from a valid paper. As mentioned above, the chopper and sensor arrangement 66–74 produces pulses in synchronization with the movement of the note along the test path 26 which allows the sensors and detectors 148–152 to collect a large number of data samples from specific areas on the note as the note travels the path 26. For each such sensor 148–152 a test equation may be applied to the data acquired thereby to determine the note authenticity. The first of these test equations is:

$$\frac{1}{n}\sum_{i=1}^{n}(xi-\bar{x}i)^2$$

Here, xi is the actual value of the data acquired at the test position i and $\bar{x}$i is the average value of test data which should be acquired from a valid note at that testing area, as may be acquired from testing a large number of such notes. Thus, this equation results in a final number indicative of the amount by which the test value of the note under consideration deviated from the average values. By squaring the value obtained by each test, the sign of the error is disregarded and the error is amplified. Of course, the final test for validity is whether or not the results obtained from the three such summations from the various tests of sensors 148–152 lie within suitable thresholds as may be preselected and biased into a comparator or the like. It will be obvious to one skilled in the art that a valid note will satisfy this first equation with a solution near zero. It has been found that this equation results in highly accurate tests.

A second equation which may be used for each of the sensors 148–152 is:

$$\frac{1}{n}\sum_{i=1}^{n}\left[\frac{xi-\bar{x}i}{3\sigma i}\right]^2$$

As can be seen, this is substantially the same as the first equation, but for the division of the error by the standard deviation for each testing area of 3$\sigma$i. This test has all of the benefits of he first test and further includes an evaluation with respect to three times the standard deviation. It will be appreciated that valid papers will satisfy this second equation with a solution that is between zero and unity.

Finally, a highly accurate test has been found to be achieved using the equation:

$$\frac{1}{n}\sum_{i=1}^{n}zi\bar{z}i \text{ where } zi=\frac{xi-\bar{x}}{\sigma}$$

In this equation, xi is again that value acquired by the associated sensor 148–152 at the area i along the test path. The value of $\bar{x}$ is the average of all of the xi's tested by the associated sensor 148–152 on that actual note. The value of $\sigma$ is the standard deviation of the xi's found for that note. The value of $\bar{Z}i$ is the average Zi for a valid note, again as would be acquired from testing a large plurality of valid notes and tabulating the results. It has been found that using the last test equation that for a valid note the test result will be near unity. It has also been found that this test equation is highly accurate and reliable.

By using appropriate sensors 148–152 and one of the equations given above, or another suitable equation which might be derived by one skilled in the art, it can be seen that a large number of data samples may be used to obtain an overall picture of validity of the paper tendered as being valid. Further, these equations can distinguish highly accurate facsimiles from real currencies because the error aggregates in the equation and by the summation process. Accordingly, even the best photocopies fail to pass the validation tests.

The foregoing tests may be conducted utilizing presently available microprocessors and the like. Obviously, the test results must be stored and they must be compared against values stored in tables which are indicative of valid securities. These values are obtained from a statistical analysis of real notes. However, by operating in a digital mode with a data processor having memory available, a large number of tests may be performed and the same apparatus may be used for the determining the authenticity of any of a large variety of notes or securities.

Further, tests may be conducted irrespective of whether the note is placed in the slot 20 top-up or bottom-up, or whether it is placed in the slot 20 front-first or back-first. By storing the test results and being able to compare the test results with stored tabulated values, the acceptor of the invention is capable of distinguishing the validity and value of any of a large number of notes irrespective of the posture in which they are submitted to the acceptor. The ability to utilize the three stationary sensors 148–152 of the invention to conduct a large plurality of tests and distinguish with accuracy the authenticity and value of the paper offered is a result of the sophistication of the test equations used and the amplification of errors achieved thereby.

As mentioned above, the processing of the instant invention may be achieved utilizing a microprocessor, preferably of the type manufactured as Motorola Model 6802. Communications with the microprocessor are achieved by interface circuitry of the nature shown in FIGS. 13–15, with the microprocessor elements themselves being shown in FIG. 16. It will, of course, be understood that the actual data processing is under program control of the microprocessor and will be in accordance with a flow chart shown in FIG. 17 and discussed hereinafter. It will be appreciated that those skilled in the art would be able to program and operate the structure of the invention by following the teachings of FIGS. 13–17 hereof and by further following the programming procedures set forth in "Motorola Specification Sheet For MC6802", ADI-436, copyrighted by Motorola Inc. In 1978.

Figures 13A, 13B, 13C, 13D:
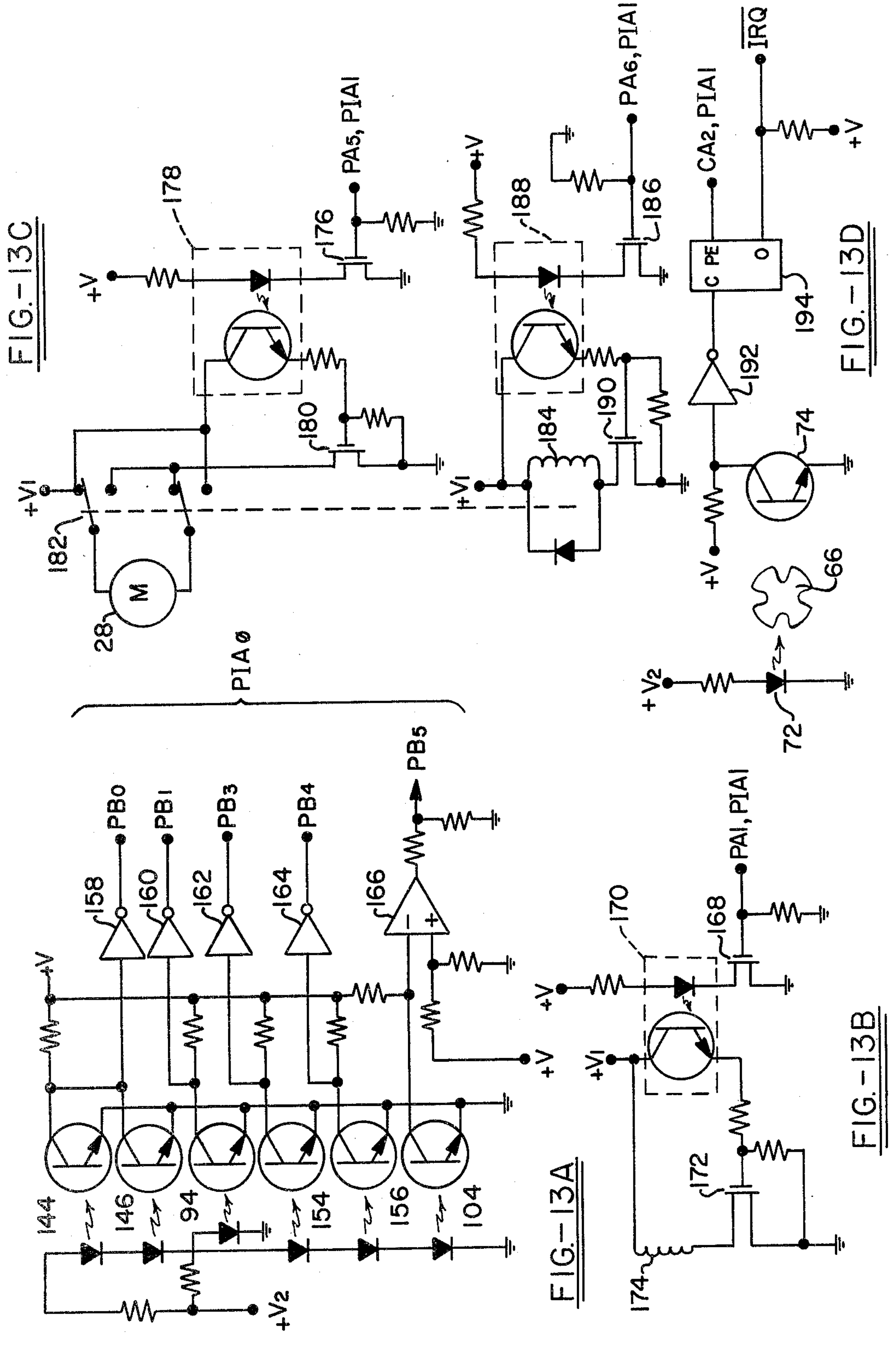
FIGS. 13A–D, presents schematics of the position sensors, gate solenoid, motor control, and optional chopper circuits of the invention, respectively.

With particular reference now to FIG. 13A, it is first shown that the photodetectors 144,146 at the front of the slot 20, the sensor 94 of the front gate 78, the short and long detectors 154,156, and the rear gate sensor 104 each comprise a light emitting diode in operative communication with a phototransistor. The outputs of the photodetectors are passed to the listed inputs of the peripheral interface adaptor number 0 (PIA0) of FIG. 16. The PIA is a standard processing element, manufactured by Motorola under part no. 6821, and is operative for transmitting data from a peripheral source to the microprocessor chip or memories. In any event, it should be specifically noted that the photodetectors 144,146 are connected in a "wire AND" configuration through the inverter 158 to the input PB0. Accordingly, an output is presented to the input PB0 only when both detectors 144,146 are covered as discussed hereinabove. Similarly, the sensor 94 of the front gate emits a signal to the input PB1 via the inverter 160 to indicate the state of actuation of the front gate 78. The sensors 154,156 function through inverters 162,164 to their shown inputs to indicate whether or not those sensors are covered, providing data to determine the length of the paper being offered. Finally, the sensor 104 of the rear gate 98 is passed through an amplifier 166 to the input PB5 to indicate that the valid note has cleared the rear gate.

Also included as part and parcel of the control circuitry is means for actuating the solenoid 88 of the front gate 78. As shown in FIG. 13B, a power field effect transistor (FET) is actuated by a signal received from PA1 or PIA1, indicating that a paper has been offered at the slot 20, covering both detectors 144,146. The FET 168 is gated into conduction, illuminating the light emitting diode of the optical isolator 170 which, in turn, energizes the FET 172. Conduction of the FET 172 energizes the coil 174 of the solenoid 88, appropriately actuating the gate 78. It will be appreciated that the optical isolator 170 comprising an LED and a photodetector transistor are used to prevent coupling of noise from the solenoid 88 back into the logic circuitry controlling the function of the invention.

With reference to FIG. 13C, it can be seen that operation of the motor 28 is under control of the microprocessor. As shown, in input from PA5 of PIA1 is operative to turn on the power FET 176, energizing the optical isolator 178, with the resultant gating into conduction of the power FET 180. The motor 28 is then energized via contacts 184 as shown to function in a forward mode of rotation. Of course, this rotation continues as long as there is a gating signal present from the output PA5 at the FET 176. Determination as to the rotational direction of the motor 28 is controlled by circuitry receiving an input from PA6 to PIA1. This signal actuates the power FET 186 which, through the optical isolator 188, controls the power FET 190. The FET 190 operatively controls the coil 184 of the relay switch having the contacts 182 connected to the motor 28. When actuated, the relay 182,184 switches contacts, reversing the voltage polarity on the motor 28, and causing the motor to drive in a reverse direction. Accordingly, depending upon whether the note is being received or returned to the depositor, a signal will be present on PA6 of PIA1 to control the direction of rotation of the motor.

Finally, with reference to FIG. 13D, it can be seen that the chopper 76, interposed between the light source 72 (LED) and the photodetector 74 is operative through an inverter 192 to control a counter 194. As discussed above, the motor 28 is preferably a 5,000 rpm motor and the chopper 66 has 12 vanes. Accordingly, the output of the inverter 192 is a 60 KHZ output, resulting in a high degree of accuracy between the pulses and the note position in the path 26. However, the frequency of these pulses is divided down by the decoded output of the counter 194 to apply to input IRQ of the microprocessor chip of FIG. 16. The count begins when a pulse enable input is received by the counter 194 via the CA2 output of PIA1, as shown, Accordingly, when the photoscanner 148 senses the leading edge of the paper, a pulse is emitted via CA2 to enable the counter 194. There is thus presented to the microprocessor chip a clock pulse of 1 KHZ beginning with the leading edge of the paper and synchronous with the movement thereof through the path 26. It will be appreciated that the microprocessor utilizes the output of the counter 194 to determine when data samples are to be taken from the testing sensors 148–152.

Figure 14:
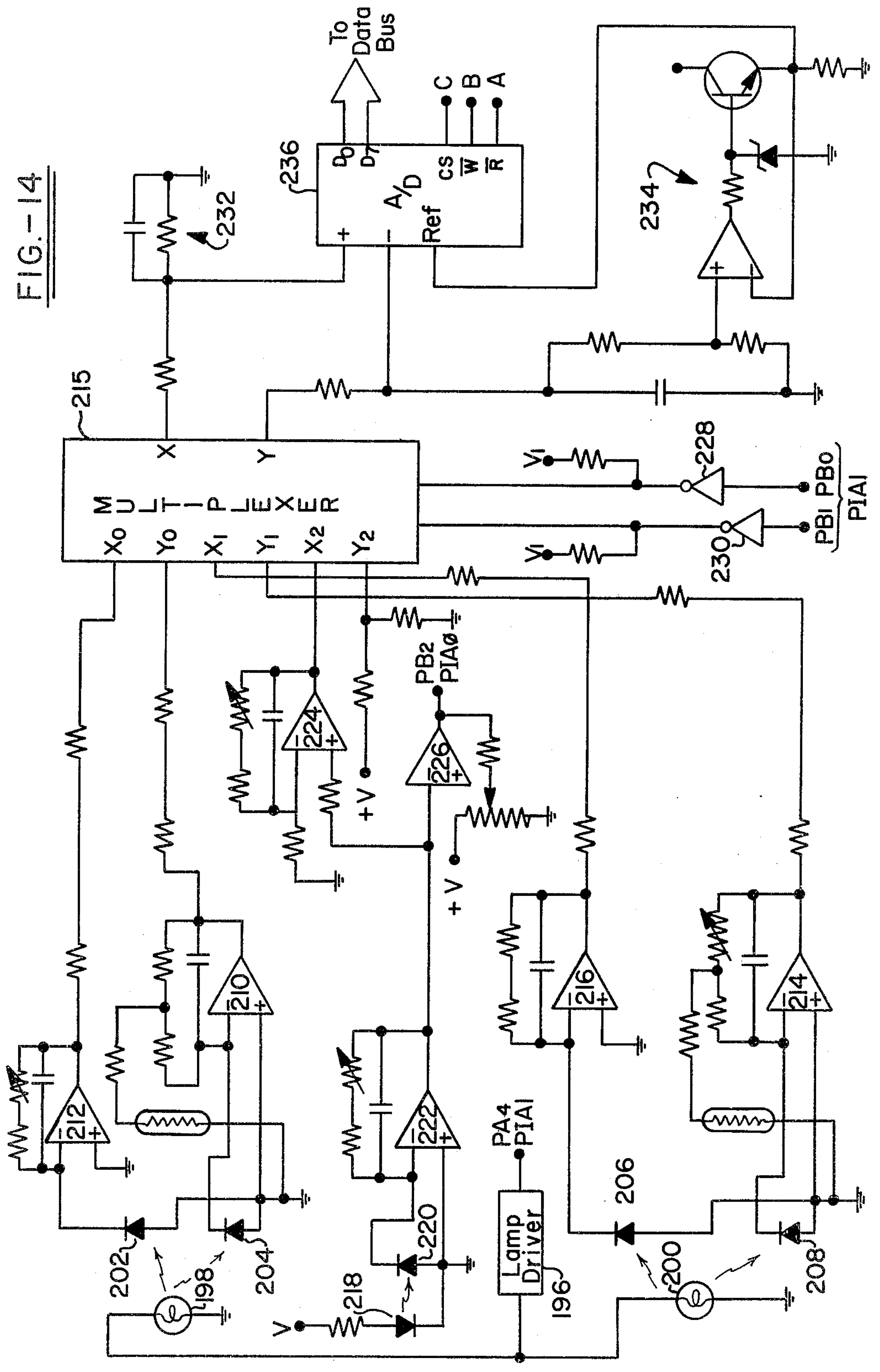
FIG. 14 is a circuit schematic of the optical authenticity test circuitry of the invention.

With reference now to FIG. 14, the sensing circuitry used in association with the sensors 148–152 may be seen. Here it is shown that a lamp driver 196 is connected to output PA4 of PIA1 and is actuated when the sensors 144,146 determine that a note has been presented at the input of the slot 20. The lamp driver 196 is operative to illuminate the lamps 198,200 which cast light upon the note passing along the path 26. Associated with the respective lamps 198,200 are sets of photodetectors 202,204 and 206,208 adapted for receiving light reflected from the paper or transmitted through the paper as that paper passes along the path 26. As mentioned above, a variety of tests may be performed dealing with either light transmission or reflectance, such tests being well known to those skilled in the art. In any event, it is presented that the lamp 198 and detectors 202,204 comprise the sensor 150 while the lamp 200 and detectors 206,208 comprise the bottom detector 152. The outputs of the detectors 202,204 are passed to respective amplifiers 212,210 which amplify the signals received and pass them to appropriate inputs of the multiplexer 215. Similarly, the amplifiers 214,216 receive the outputs of the detectors 208,206 and transmit those outputs to appropriate inputs of the multiplexer 215. Finally, the output of the photodetector 220 is passed to an amplifier 222 with that amplifier presenting an output signal corresponding to the light incident to the detector 220. It will be understood that the amplifier 222 may be provided as a logarithmic amplifier by the addition of a diode in its feedback network. In such case, the output of the amplifier 222 would be a signal corresponding to the optical density of the paper itself. Such sensing is fully treated in copending patent application Ser. No. 922,637, filed July 7, 1978, entitled "LOGARITHMIC PRIMARY TESTING SYSTEM FOR SECURITY VALIDATION," and assigned to Ardac, Inc., the assignee of the instant application. In any event, the output of the amplifier 222 is passed to an amplifier 224 provided for scaling the signal for application to the multiplexer 215. Similarly, the output of the amplifier 222 is passed to the amplifier 226 which presents a signal to the input PB2 of PIA0. It will be appreciated that the elements 218,220 comprise the sensor 148 of FIG. 12 and that the signal emitted from the amplifier 226 to the appropriate input of PIA0 advises the microprocessor that the front edge of the paper has been sensed and that the counter 194 might be enabled for synchronization purposes.

It should be noted that the multiplexer 215 is gated via inverters 228,230 to select pairs of inputs to be transmitted to the output. As noted, the outputs of amplifiers 212,210 are respectively designated $X_0$ and $Y_0$ while the outputs of the amplifiers 216,214 are respectively $X_1$ and $Y_1$. The output of the amplifier 224, being a signal corresponding to the output voltage of the density scanner 148, is applied to the input $X_2$ while the input $Y_2$ is connected to a fixed voltage provided by a voltage divider. The outputs to be presented by the multiplexer 215 are selected via the outputs PB0 and PB1 of PIA1. It will be appreciated that only three sets of paired outputs are selected; $X_0$, $Y_0$, $X_1$ $Y_1$, and $X_2$ $Y_2$. The X outputs are passed through a voltage divider 232 to the positive input of the analog to digital converter 236. The negative input of the converter 236 receives the Y outputs of the multiplexer 215. The A/D converter 236 also receives a reference input signal which, in this case, is the Y output of the multiplexer 215 scaled by a voltage divider 234. The A/D converter 236 is a standard unit manufactured by National Semiconductor under part no. ADC0804 and is operative for presenting a digital output on the line D0–D7 which is the digital equivalent of the ratio of the X and Y input voltages. By knowing the range of signal values that will be received from the multiplexer 215, and by appropriately selecting the values for the voltage dividers 232,234, the A/D converter 236 may be offset to increase the resolution thereof.

Utilizing the A/D converter 236 discussed above, there is a ratio provided with respect to the light sensed from the paper by the detectors 202,204 from the single light source 198 and, similarly, there is a ratio provided respecting the light sensed by the detectors 206,208 of the light from the paper provided by the source 200. It will be appreciated that the detectors 202,208 may be covered with respective filters such that each detector may be responsive to a different wave length of light. In this situation, each of the sensors in a set will be sensing only that light which its filter allows it to accept and, accordingly, the ratio technique then allows one response of the paper to be compared against the other. This technique is described more fully in co-pending patent application Ser. No. 858,115, entitled "Apparatus for Testing the Presence of Color in a Paper Security", now U.S. Pat. No. 4,183,665.

It should be noted that the density scanner 148, comprising LED 218 and detector 220 have the outputs thereof ratioed with a fixed voltage provided to the $Y_2$ input of the multiplexer 215. Accordingly, the digital output of the amplifier 236 corresponding to the light sensed by the detector 220 is scaled voltage directly proportional to the light so sensed.

Figure 16:
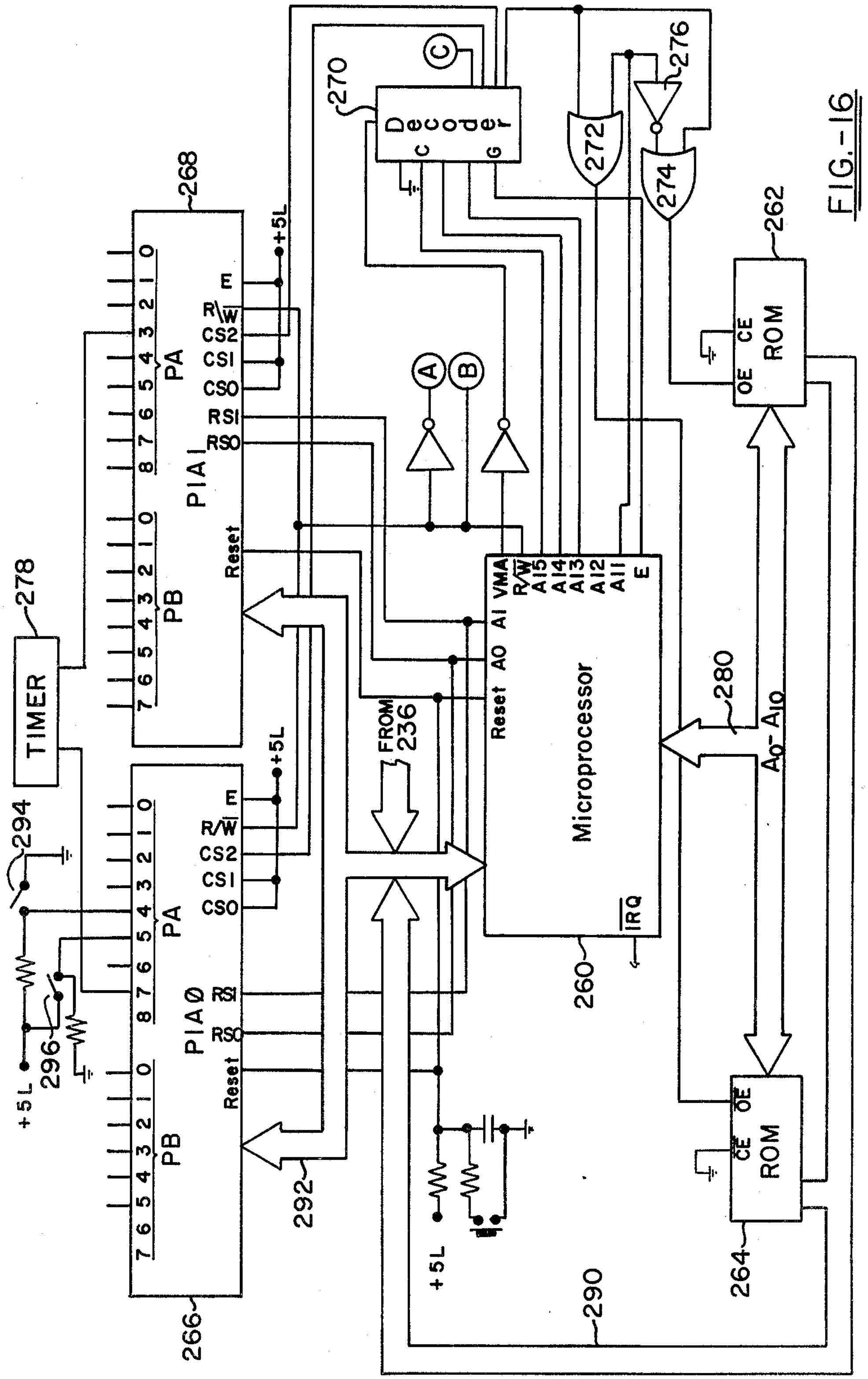
FIG. 16 is a circuit schematic of the microprocessor interconnections of the invention.
Figure 17A:
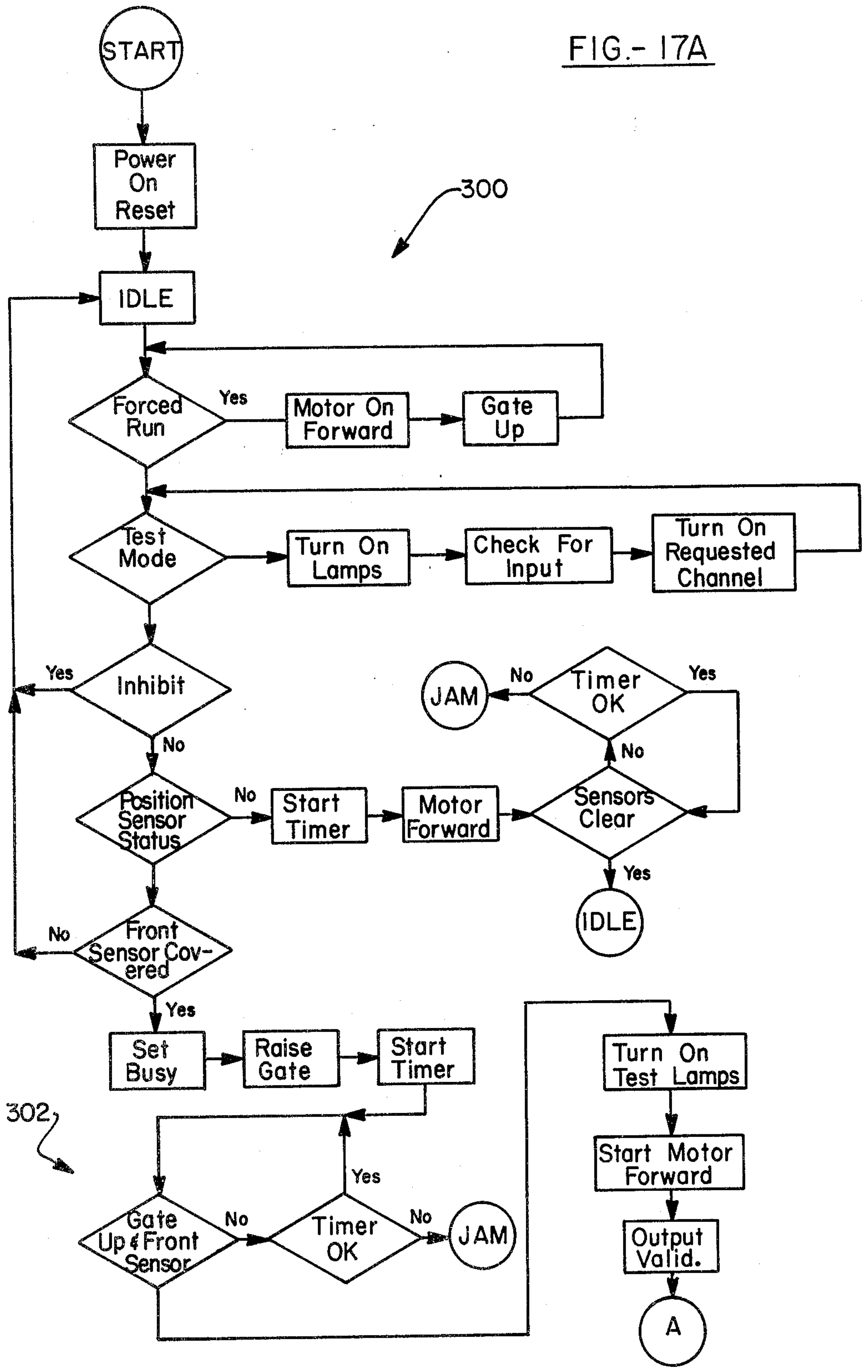
FIGS. 17A–17E are a flow chart of the program control of the microprocessor to achieve the operational techniques of the invention.
Figure 17B:
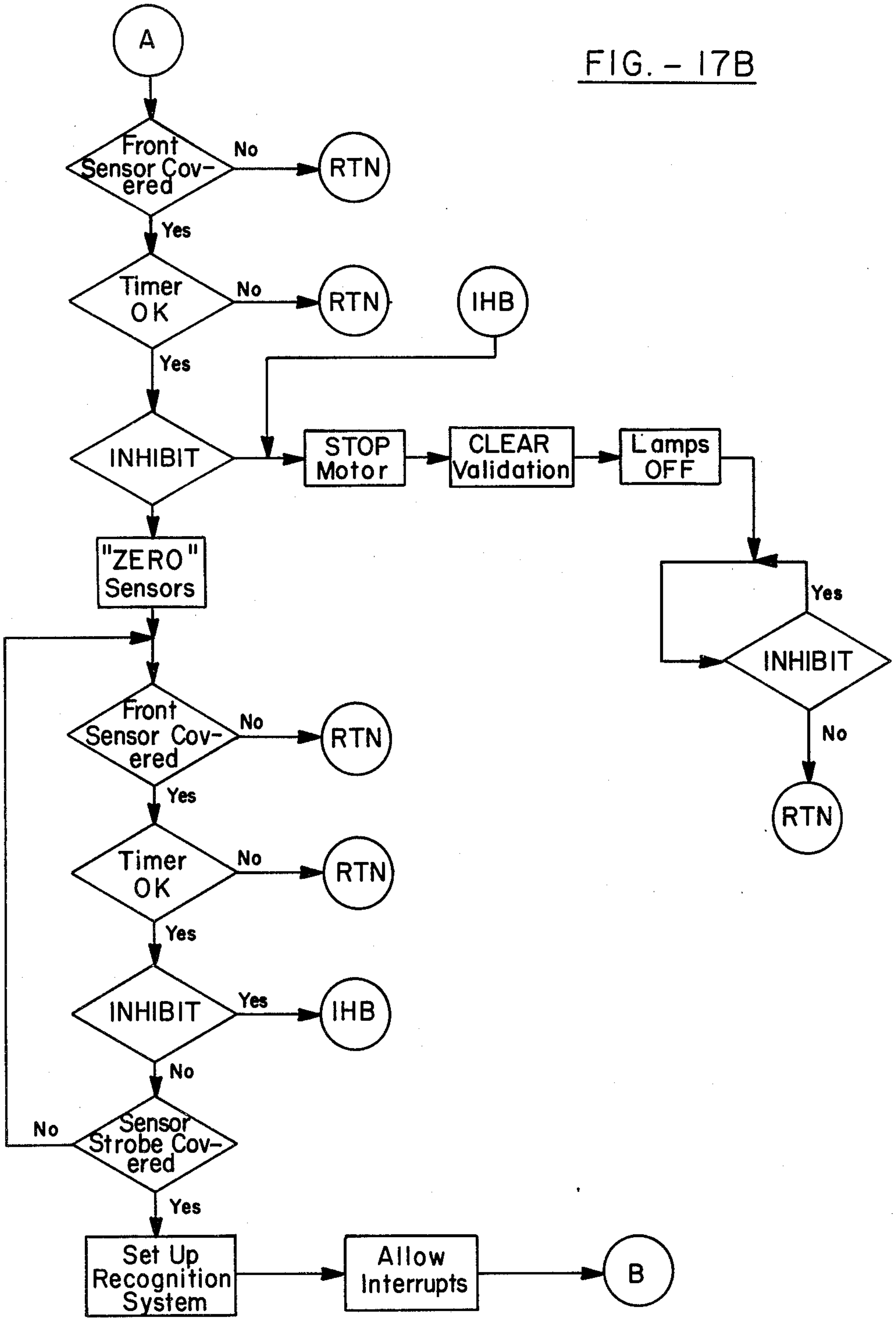
Figure 17C:
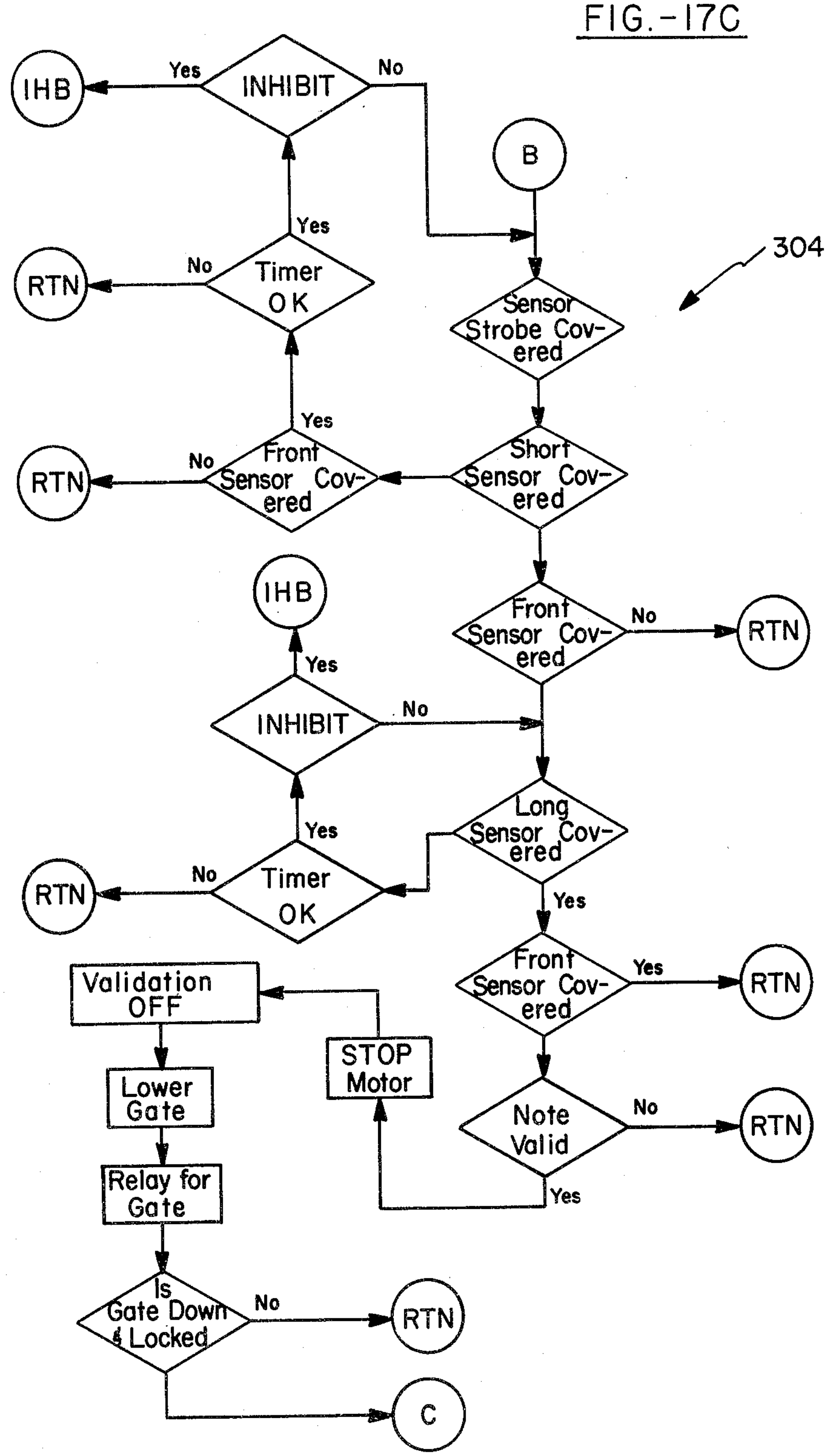
Figure 17D:
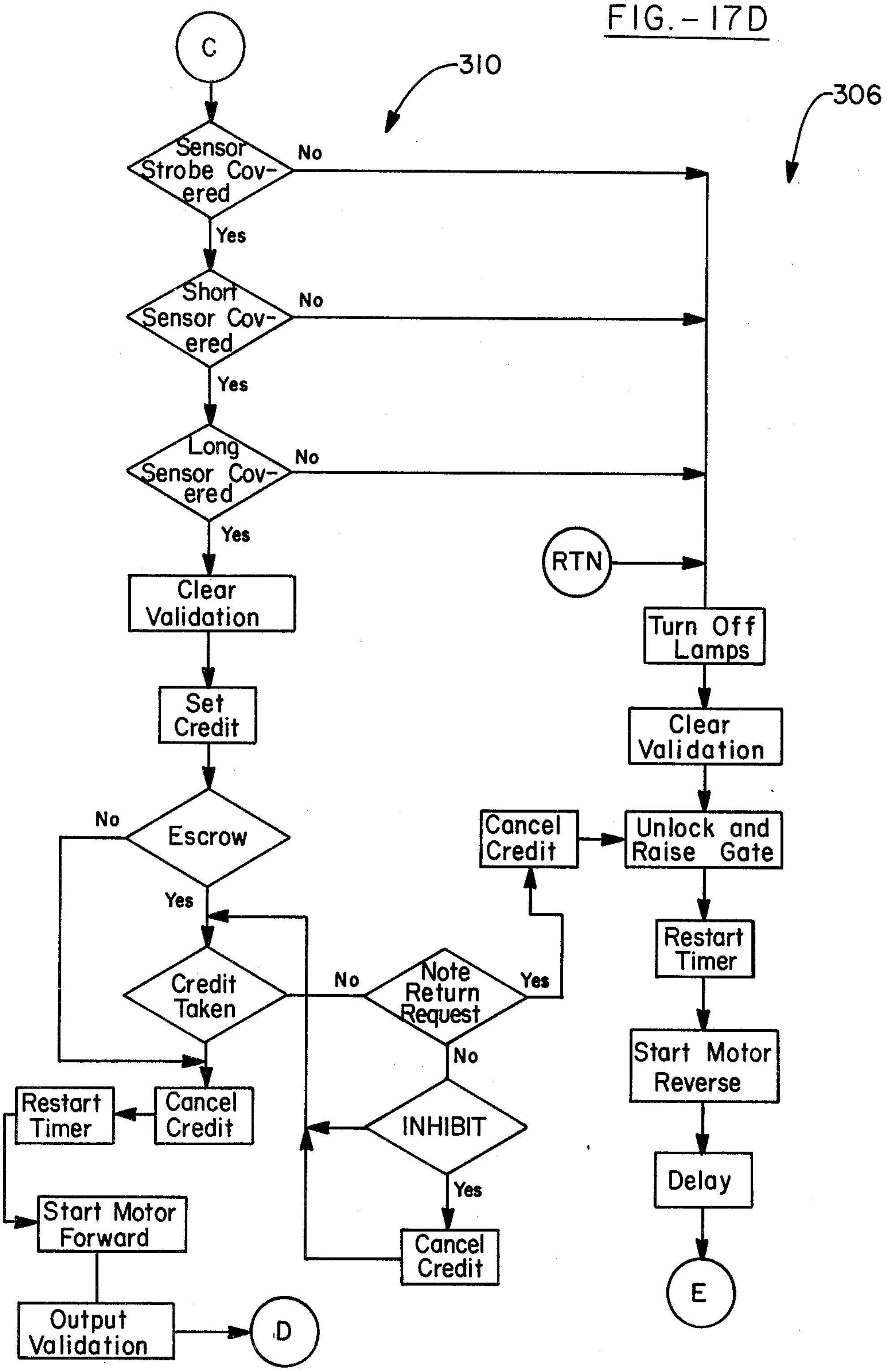
Figure 17E:
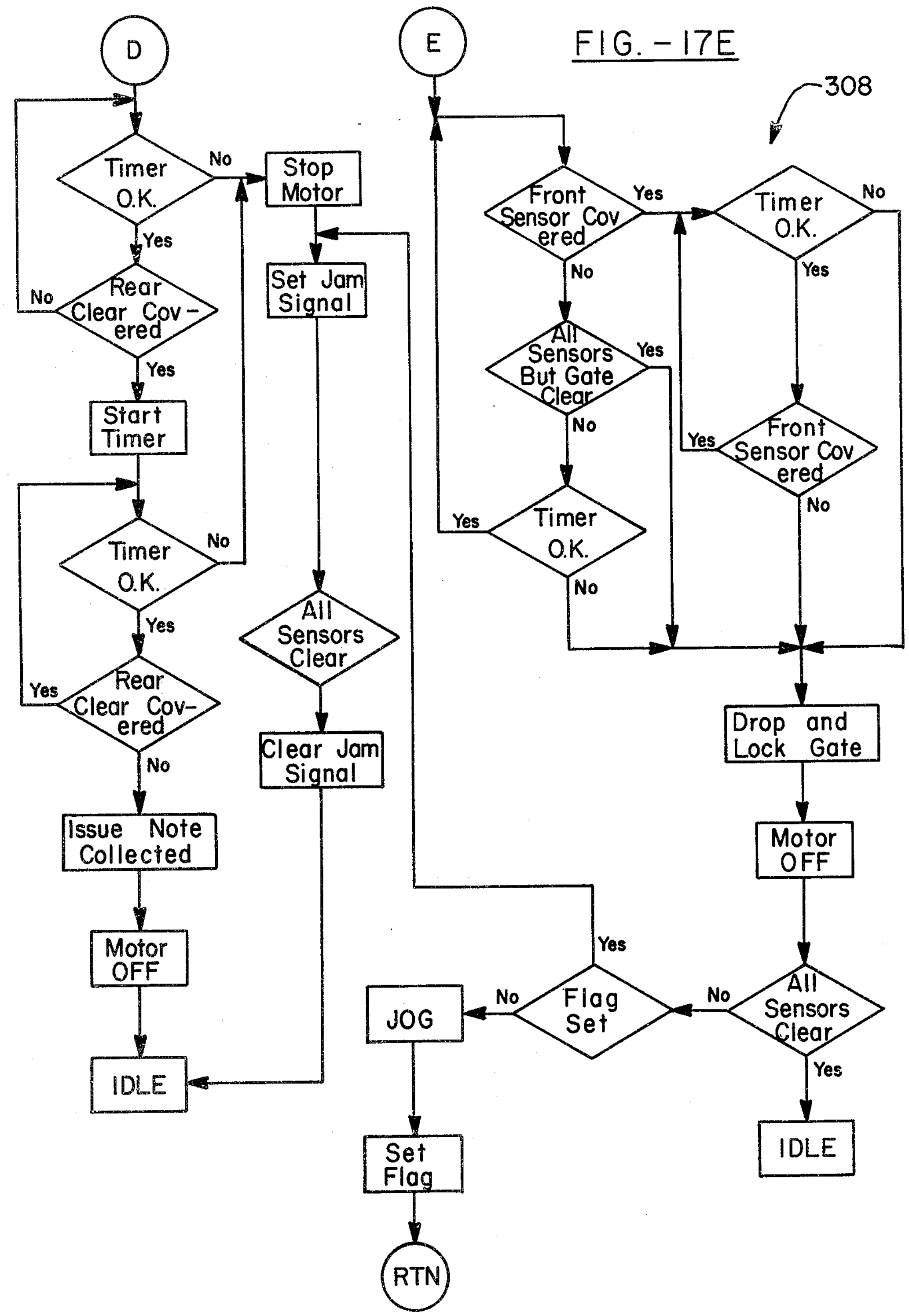

It will be noted that the digitized data from the converter 236 is provided to the data BUS of FIG. 16 as shown. Regulation of this data transmission is controlled via the input ABC from the circuitry of FIG. 16. While the circuitry will be discussed hereinafter, it should be understood that under program control of the microprocessor, the AB inputs control the transfer of data from the A/D converter 236 to the data BUS while the C input is the "chip select" input which enables the A/D converter 236 for operation.

The microprocessor utilized for control in the acceptor of the instant invention will, in most instances, communicate with the peripheral equipment such as a changer, a vending machine, a gasoline pumping system, or the like. Accordingly, communications will be made between such auxiliary equipment and the acceptor of the invention and the circuitry of FIG. 15 illustrates the manner in which such communication is made. As shown in FIG. 15A, a plurality of switches 240, 246 may be used to communicate with the acceptor. Each switch is operatively connected through an optical isolator 248 to an associated input of the circuitry of FIG. 16 to communicate with the microprocessor that certain modes of operation are desired or that certain events have occurred. For example, the switch 240 may be within the acceptor for actuation by a serviceman to achieve a forced run of the motor 28 for service procedures. The closure of this switch 240 is communicated via the input PA3 of PIA0 to achieve such control via the microprocessor program. Similarly, a switch 242 may be provided for the operator to select the return of his note if, after the note has been determined valid and a credit has been given, the user determines that he does not want to make a selection after all. The switch 244 may be actuated by peripheral vending equipment or the like to indicate that the credit that was given has, indeed, been used and that a vend has been made. Finally, the switch 246 may be provided to inhibit operation of the acceptor as may be desired. Again, the status of each of these switches is communicated via the inputs to PIA0 as shown and are used under program control to achieve the desired results.

Figure 15B:
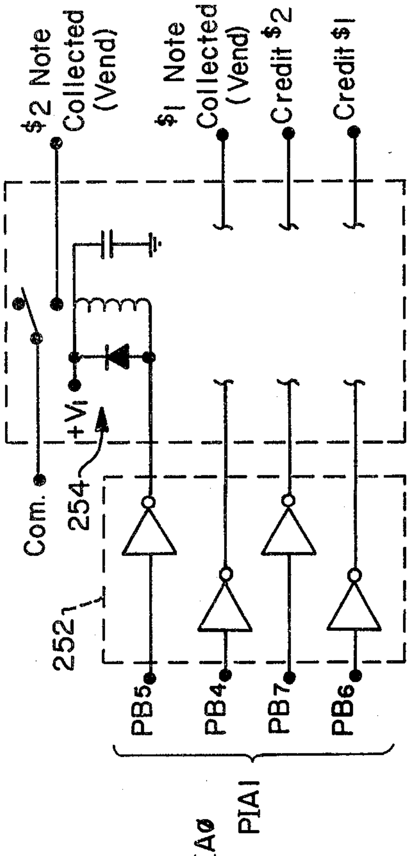
FIGS. 15A–C, presents circuit schematics of various control subcircuits of the invention.
Figure 15A:
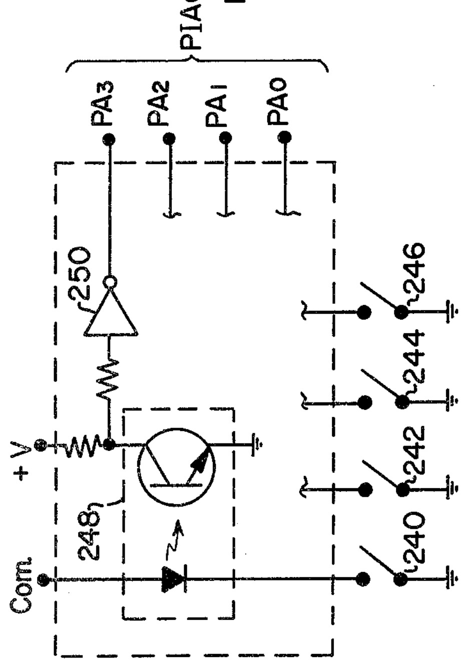

As further shown in FIG. 15B, the acceptor communicates to the peripheral equipment such as a changer or vending machine the amount of credit that has been given for the note validated and to authorize the vending of a selected item once that note has actually been collected by passing from escrow through the rear gate 98 and to the final collection station. As shown, PIA1 communicates via the outputs of PB4–7 through a plurality of relays to advise the peripheral equipment as to the results of the validation test and to authorize the dispensing of goods of equivalent value. As shown, the input received from PB6 or PB7, respectively, would indicate to the vending machine that a $1.00 or $2.00 bill has been received and validated and that the user is credited with the appropriate value. Accordingly, the vending machine receives the credit. When the operator seeks to use his credit, making a selection from the vending machine, the note is collected by the acceptor, passing the note from escrow through the rear gate 98, and a signal is then emitted over PB4 or PB5 to actuate the corresponding relay contact assembly to allow the selected product to actually be dispensed. As shown, each of the outputs PB4–PB7 are connected to an associated relay driver 252, operative for closing the contacts of the associated relay 254. It will further be understood that each of the remaining three inputs and outputs shown include a relay similar to the relay 254 shown in the drawings.

Figure 15C:
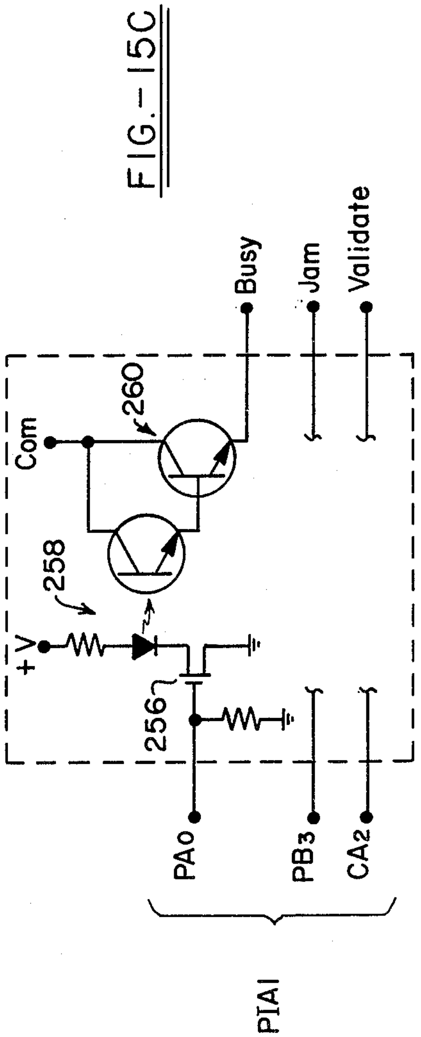

With final attention to FIG. 15C, it can be seen that the peripheral equipment is advised as to whether the validator or acceptor is busy, jammed, or in a validating mode of operation. These signals can be used by the vending machine to inhibit operation thereof or to prevent control signals therefrom from being gated to the microprocessor at particular points in time. As shown, inputs PA0, PB3, and CA2 or PIA1 respectively indicate a busy, jam, or validate state. Each of these signals is applied via an associated power FET 256 to an optical isolator 258 and a power transistor 260 to produce the appropriate signal. Again, these signals are generated under program control of the microprocessor in accordance with the program to be discussed hereinafter.

With final attention to the circuitry of the invention, reference should be had to FIG. 16 wherein the circuit interconnections of the microprocessor control circuitry is shown. The microprocessor chip 260, being chip 6802 of Motorola, is provided as the primary processing unit of the invention. This chip includes a random access memory (RAM) which is programmed to receive data and the arithmetic answers to the test equation or equations as set forth above. As mentioned earlier, the microprocessor chip 260 may be readily understood by those skilled in the art by reference to the aforementioned printed publications. Suffice it to say that this chip is capable of performing the arithmetic and "house keeping" functions required by the equations presented hereinabove and by the program flow chart set forth hereinafter.

Connected to the microprocessor chip 260 and in communication therewith via the BUS 280 are read only memory (ROM) chips 262,264. These chips are again well known to those skilled in the art and contain therein the programs necessary for controlling operation of the microprocessor chip 260 and may also be supplied with the table of the permanent data necessary for utilizing the test equations presented hereinabove.

Also included in communication with the microprocessor chip 260 are the peripheral interface adaptors, PIA0 and PIA1, respectively designated by numerals 266,268. Again, these adaptors are manufactured by Motorola under part no. 6821 and are readily understood by those skilled in the art for their ability to communicate data from peripheral equipment and apparatus to the microprocessor chip 260. One such piece of peripheral equipment is shown as being the timer 278 connected to PA3 of PIA1. The timer 278 is used by the program of the invention which allows a certain length of time for certain physical processes to occur as will become apparent hereinafter.

Intercommunication and selection of the various elements used for controlling the microprocessor 260 is achieved via the address decoder 270 which is provided in interconnection with the microprocessor 260. As shown, the address decode 270 may make access to either the ROM's 262, 264, PIA0, PIA1, or the A/D converter 236. It will be noted that the address decoder 270 makes access to one of the ROM's 262,264 via the logic gates 272,274 with the inverter 276, interconnected between the microprocessor chip 260 and the gate 274 guaranteeing that communication with the ROM's is conducted on a mutually exclusive basis.

The addressing of the ROM's 262,264 is conducted via the address BUS 280, while data communications therefrom is conducted via the data BUS 290. This data BUS communicates with the BUS 292 to enable data transfers to any of the elements 260,266,268. Additionally, and as was discussed hereinabove, the data from the A/D converter 236 is communicated over the data BUS line 292 to the microprocessor 260.

It should also be briefly noted that elements accessed by the address decoder 270 are either written into or read from under control of the microprocessor 260 and the output R/$\overline{W}$. As shown, the PIA's are controlled by this output as is the A/D converter 236 via the A,B lines discussed above.

With final attention to FIG. 16, it can be seen that the input PA4 of PIA0 is connected to a switch operative for advising the sysem whether or not an escrow feature is desired. By closing the switch, the microprocessor program determines that once a note has been authenticated, it is to be held in escrow until the credit given therefor is used or the note is requested to be returned. This again will become apparent with respect to the program presented in FIG. 17. Finally, the switch 296 is provided at the input PA5 of PIA0 to allow a service technican to illuminate the test lights, for example, the lamps of the sensor 144–156 for adjustment and tuning purposes. Of course, such a switch need not actually be provided under program control and could, indeed, be connected in parallel to these light sources for testing purposes.

It is presented that those skilled in the art, having made the circuit structure presented in FIGS. 13–16, above, would be able to make and practice the invention in accordance with any of numerous programs. These programs are stored in ROM's 262,264 and serve to regulate and control operation of the system. Most generally, these programs are permanently stored in the ROM's, along with necessary data tables for arithmetic and comparison purposes, all of this being well known to those skilled in the art. Accordingly, the flow chart shown in FIG. 17 is but a preferred embodiment and presently contemplated best mode of the invention and an embodiment of which will enable those skilled in the art to make and practice the invention.

With particular reference now to FIG. 17, it can be seen that the program of the system begins with a traditional Power On Reset routine which turns on the required power supplies and resets registers and the like. The system then goes into an Idle routine which basically performs standard housekeeping functions within the microprocessor. Of course, the processor continually senses to determine whether the forced run switch 240 may have been actuated, in which case the motor 28 is caused to rotate in a forward direction to drive paper through and the front gate 78 is opened to allow such passage. If the forced run switch 240 is not actuated, sensing is made to see if the test switch 296 is thrown. If such is the case, the test lamps are turned on and a test program or sequence is actuated to allow a technican or other service personnel to check out the system. If neither a forced run nor test mode of operation has been selected, the system senses whether or not the inhibit switch 246 has been closed. If the system is in the inhibit mode, it returns to the Idle loop and, if not, it scans the position sensor 148 to determine whether that sensor is covered or not. If the sensor 148 is covered, indicating that there was a note or paper left over the sensor and present there when power was turned on, the hardware timer 278 is started, the motor 28 is caused to move forward to collect the paper, and a test is then made for whether or not the sensor 148 is clear. After a predetermined period of time, if the front sensor 148 is not clear the microprocessor determines that the system is jammed and a jam signal is transmitted to the peripheral equipment as discussed above, and the system shuts down. If the sensor 148 clears, by forward movement of the motor 28, the system returns to the Idle loop. The logic path of the program just described is designated by the numeral 300 in FIG. 17.

If the test sensor 148 is clear, the inhibit switch, test mode switch, and forced run switch are not actuated, then the system scans the front sensors 144,146 to determine the presence of a paper. When the front sensors are covered the busy signal is set as discussed above and the gate 78 is raised. The hardware timer 278 begins. A determination is then made via the sensor 94 whether the gate is up and the front sensors 144, 146 are covered. If the sensor 94 indicates for a fixed period of time, determined by the timer 278, that the gate is not open but that the front sensors 144,146 are covered, the jam signal is created and the system shuts down, indicating that the front gate 78 is jammed.

If the gate is open and the front sensors are covered, lamps 198,200 are illuminated via the lamp driver 196 to begin the validation test. The motor 28 is actuated to drive the paper forward through the test path 26 and a validate output is emitted as discussed above to advise the peripheral equipment that the system is in its validation process.

After the motor is started, a determination is made whether or not the front sensors 144,146 are still covered. If not, a return cycle is entered into, in which the motor rotation is reversed, returning the note, and the system returns to the Idle loop. If the front sensor is covered, but the timer 278 has timed out, the note is similarly returned. However, if the front sensor is covered and the timer has not timed out, it is determined whether or not the inhibit switch 246 has been thrown. If it has, the motor 28 is stopped, the validate signal is cleared, the lamps 198,200 are turned off, and the system waits until the inhibit switch is turned off, at which time the note is returned as discussed above. This portion of the flow chart is designated as numeral 302.

Provisions may be made in the program of the invention to "zero" the sensors prior to conducting the actual validation test. In this instance, the sensors 148–152 are read in an idle condition and that reading is used to generate a bias value for all readings taken during the test to compensate for voltage or temperature drift and the like. For example, prior to testing, the lamps 198,200 may be turned on to reflect or transmit light from respective media. The responsive ratio output values of the A/D converter 236 may then be used to normalize test readings. In any event, at this point a determination is then made as to whether or not the front sensors 144,146 are still covered, whether the timer 278 is still running, and whether or not the inhibit switch 246 has been thrown. Appropriate action is taken. If the timer, switches, and front sensors are properly actuated, a determination is then made as to whether or not the sensor strobe 148 has been covered. If not, the system loops on the determination just recited. If the sensor 148 is covered, the recognition system is set up by clearing memory and appropriate registers in preparation for taking readings and by performing other such standard housekeeping techiques. Further, in setting up the recognition system, immediately upon the sensor 148 being covered, the pulses from the counter 194 are supplied to the $\overline{IRQ}$ input of the microprocessor chip 260. Once the recognition system has been set up, the program is adapted to receive interrupts which allows the microprocessor to receive data from the sensor 148–152 and to utilize that data in the test equations discussed hereinabove to determine authenticity. These subroutines will be discussed hereinafter with respect to FIGS. 19–21. The microprocessor effectively counts the pulses received from the counter 194 and begins testing when it has received enough pulses to start the test, indicating that the note is properly positioned under the sensors 148–152, and concludes the test when enough samples have been taken to conclude that the note has passed through the testing area. When such is the case, interrupts are no longer allowed by the microprocessor. It will be understood that continuing through the entire validation program to be further discussed directly hereinafter, the interrupts are made and that portions of data are taken from the paper at particular counts as received from the counter 194.

After the recognition system is set up and interrupts are allowed, a determination is made as to whether or not the sensor stroge 148 is covered. If it is not, the bill is returned via the return subroutine. If it is covered, a determination is made as to whether or not the short sensor 154 is covered. If it is not, the system loops to determine whether the front sensors 144,146 are covered and if the time period allowed for sensing whether or not the tendered paper is too short has expired. As can be seen, if the short sensor 154 is not covered and the front sensors 144,146 are not covered the paper is returned. Similarly, if the short sensor is not covered and the front sensor is covered then the system loops for a predetermined period of time in which the short sensor must become covered. If the timer times out before it is covered, the paper is returned. Of course, this loop also includes a check to see if the system has been inhibited.

If the short sensor is found to be covered at the same time that the sensor strobe 148 is covered, a determination is made as to whether or not the front sensors 144,146 and the long sensor 156 are simultaneously covered, indicating that the paper is too long to comprise a valid security. Again, the paper must travel the path 26 to the long sensor within a fixed period of time as determined by the timer and a check is made to see if the system is inhibited. If the long sensor 156 is covered and the front sensors 144,146 are covered, the paper is returned. If the long sensor is covered but the front sensor is not covered, the paper is not too long to be deemed valid and the test is made as to whether or not the note is a valid one. The portion of the flow chart respecting paper length as just discussed is designated generally by the numeral 304.

The note is determined to be valid utilizing the arithmetic capabilities of the microprocessor and by incorporating one of the test equations presented hereinabove. A table look-up technique is utilized once the values from the equation have been acquired for each of the three optical scanners 148–152. By comparing the calculated values to the various tables, the validity and denomination of the note may be determined. If the note is determined to be invalid, it is returned via the return subrountine. If valid, the motor 28 is stopped, the validate signal is removed, the gate 78 is closed via the solenoid 88 and a determination as to whether or not the gate is closed and locked via the sensor 94 and vane 96. If the gate is not closed and locked, the paper is returned while, if it is, a scan is made of the outputs of the sensor strobe 148, and the short and long sensors 154,156, and if any of these sensors are not covered, the return subroutine is entered into which, as shown at 306, consists of turning off the test lamp 198,200, clearing the validate signal, opening the front gate 78, restarting the timer 278, reversing the motor 28, and allowing a predetermined time delay for the rollers to run in the reverse direction to return the bill or paper to the user. In the return process, a scan is made of the front sensors 144, 146 to determine if these sensors have been cleared and if they have been cleared in a preselected period of time as set forth in the loop 308. In this loop, if all of the sensors except the gate sensor is clear the gate is closed and locked or if the timer times out the gate is closed and locked. In either event, the motor 28 is turned off and all the sensors are again checked to see if they are clear. If they are, the system returns to the Idle housekeeping loop. If not, it is determined whether or not this is the first pass through the loop 308 by checking a flag set by the computer and, if it is, a jog subroutine is entered into. This subroutine basically comprises short duration forward and reverse driving of the motor 28 in an attempt to clear a jammed note. When the jog routine is entered into a flag is set and the system returns to the return loop and again loops through the portion of the flow chart 306,308 just described. When it is found that the flag was set, indicating that one jog routine had been previously used, the jam signal is set and the system then loops until all sensors are cleared. When they are cleared, the jam signal is cleared and the Idle loop is entered into.

Returning now to the area marked 310 on the flow chart, it can be seen that if the sensor strobe and long and short sensors had been covered the validate signal would have been cleared and a credit would have been set. The determination is then made as to whether or not the machine is to operate with an escrow feature as determined by the state of actuation of the switch 294. If the escrow feature is used then a determination is made as to whether or not the credit given has been used. If not, and if a return request has been made as by actuation of the switch 242, the credit is cancelled and the system enters into the return subroutine as shown. If a note return was not requested, then a determination is made as to whether or not the inhibit switch 246 has been thrown, in which case credit is cancelled. If the system does not include the escrow feature or, if it does then the credit has been taken, the credit is cancelled, the timer is restarted, the motor 28 is started in the forward direction, and a determination is made as to whether or not the bill has cleared the rear gate as determined by the sensor 104. As can be seen, a particular time period is given for the rear gate 98 to open and then another time is given in which it must close. If both times are satisfied, a signal is issued indicating that the note has been collected, which signal may be used to authorize the vending of a product as discussed with respect to FIG. 15. The motor 28 is then turned off and the system returns to the Idle loop.

Figure 18:
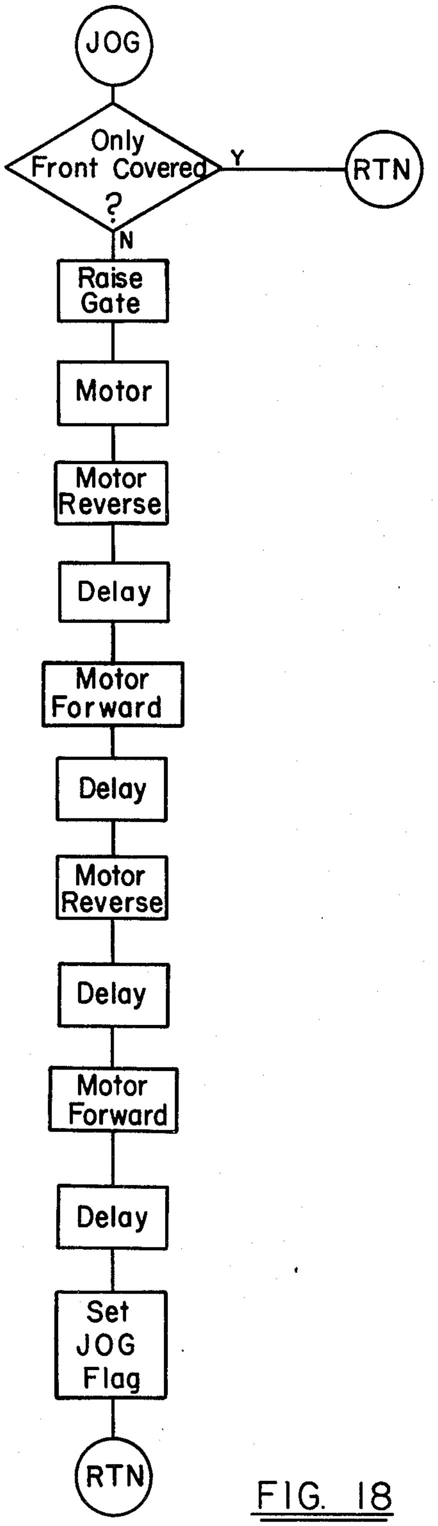
FIG. 18 is a flow chart of the JOG subroutine of the program controlling the acceptor of the invention.

The subroutine responsible for jogging paper received within the note path 18 is shown in detail in FIG. 18. As shown, when the JOG subroutine is entered into, the various sensors 144–156 are scanned and, if only the front sensors 144,146 are covered, the note is returned in the manner set forth directly above with respect to FIG. 17. However, if sensors other than the front sensors 144, 146 are covered, the gate 78 is opened and the motor 28 is energized. As shown in this subroutine, the motor 28 is alternately driven in reverse and forward directions in respective attempts to return or collect the paper jamming the conveyor assembly 10. The delay provided at each reversal of motor direction allows the system to stabilize, during which time the solenoid 184 is actuated to switch the contacts 182. It will also be noted that the JOG flag is set following the JOG subroutine such that only a single pass through the subroutine is made before setting the JAM signal as will be appreciated from consideration of FIG. 17.

Figure 19:
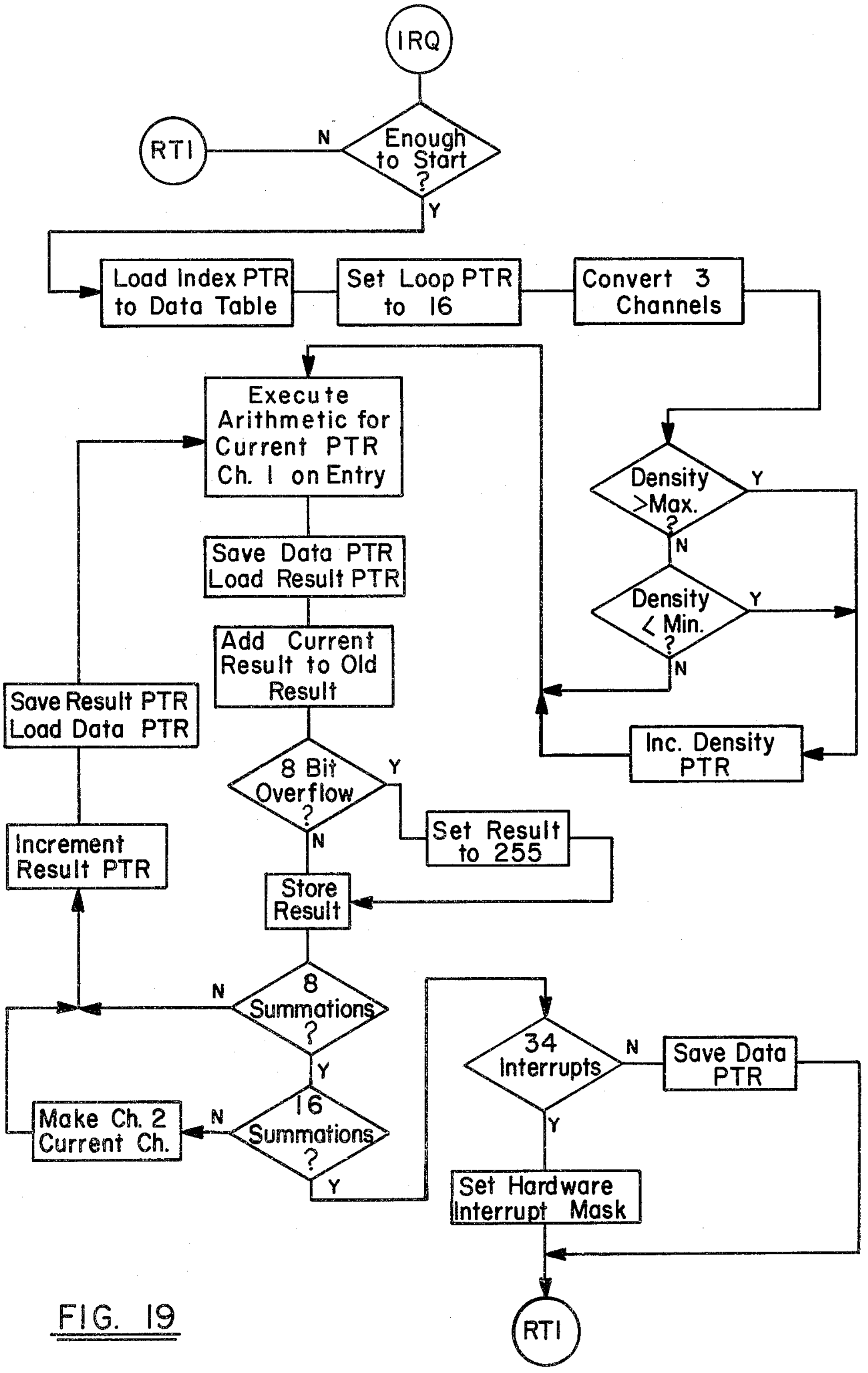
FIG. 19 is a flow chart of the INTERRUPT subroutine of the control program for the invention.

It will be recalled with reference to FIG. 17 that the control program of the acceptor provided for interrupts, during which arithmetic tabulations and checks are made with the data obtained from the various sensor channels 148–152. The flow chart of the interrupt subroutine is shown in FIG. 19, with the included arithmetic subroutine being shown in FIG. 20. The interrupt subroutine begins when enough counts have been received from the chopper assembly 66–74 and decoded counter 194 to indicate that the paper tendered is in a test position. On each subsequent decoded output of the counter 194 to the interrupt request ($\overline{IRQ}$) input of the mircoprocessor 260, the interrupt subroutine is conducted. It will be appreciated that the entire subroutine to be discussed hereinafter requires but four milliseconds to conduct, constituting extremely short interruptions of the total control program.

With specific reference to FIG. 19, it can be seen that when an interrupt is requested, an index pointer is loaded to the data table and a loop pointer is set to 16, the interrupt subroutine including 16 loops, all of which are conducted in the four millisecond time interval. The three data sensor channels 148-152 are converted or digitized by means of the A/D converter 236. Next, a determination is made as to whether or not the optical density of the paper scanned at the specific point under consideration by means of the density sensor 148 is greater than a first maximum value or less than a second minimum value. These values may be stored in tables in memory. If either situation is the case, the density pointer is increased and the arithmetic subroutine is entered into. Similarly, if neither situation is the case the arithmetic subroutine is activated without increasing or incrementing the density pointer.

The arithmetic subroutine of FIG. 20, to be discussed directly below, is then entered into for the point on the paper under consideration for channel 1, the sensor 150. The data pointer is saved and the result pointer is loaded such that the current result from the arithmetic subroutine of FIG. 20 for the particular point under consideration is added to the summation of prior points sensed by that channel or sensor on the paper. A determination is then made as to whether or not there is an eight bit overflow, this being done to conserve memory. If there is an eight bit overflow the result is set to the maximum value of 255 and the result is stored. If there is no overflow, the result of adding the current arithmetic calculation to the aggregate of previous arithmetic calculations is stored.

A determination is then made as to whether or not eight summations have been made. This is for the reason that the test program of FIG. 19 is designed to determine the value and validity of two different pieces of paper currency regardless of the manner in which the currency is offered to the acceptor. Specifically, the acceptor is programmed to validate and accept a $1.00 bill and a $2.00 bill, for example, regardless of whether the bills are offered face up or face down, or whether they are offered left edge first or right edge first. Accordingly, since there are eight possible combinations the data acquired by the channel must be added to eight different running totals. If eight summations have not been made, the result pointer is incremented and saved and the data pointer is loaded. The program then loops, as just discussed, for the next of the eight summations. When eight summations have been made, channel 2, or sensor 152, is made the current channel and the same program procedure is followed until all eight possible combinations for this sensor have been arithmetically added. When this occurs, there have been a total of sixteen summations and a determination is then made as to whether or not the total number of programmed interrupts have been achieved. In the program shown, provisions are made for 34 such interrupts along the paper, providing for a total of 102 tests. If the programmed number of interrupts have not been experienced, the data pointer is saved and return is made to the program proper as in FIG. 17, awaiting another interrupt request from the chopper and counter assembly. If the programmed number of interrupts have been experienced, an interrupt mask is provided to prevent any further interrupts and the values maintained in the result registers are then available for use in determining the validity of the paper as shown in the flow chart of FIG. 21.

It will be understood that a subroutine similar to that of FIG. 19 may readily be used for obtaining data from a plurality of known valid notes to obtain the average reference values necessary to solve the equations presented earlier herein. Indeed, these reference values may be readily obtained by entering a plurality of notes, and taking and storing data from each of the three sensors at each of the 34 locations and then, finding an average value for each such location.

Figure 20:
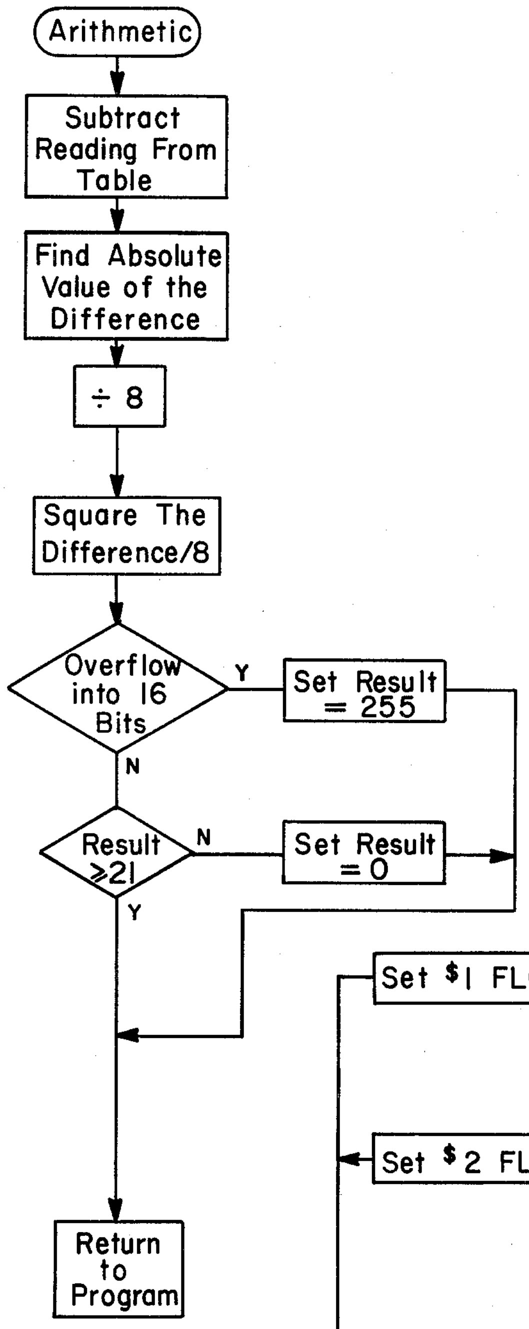
FIG. 20 is a flow chart of the ARITHMETIC portion of the INTERRUPT subroutine.

With particular reference now to FIG. 20, it can be seen that the arithmetic subroutine of the interrupt subroutine includes the arithmetic operations necessary for achieving a hybrid of the first test equation presented hereinabove. It will be noted that this arithmetic subroutine is executed for each of the eight tests performed on each point sampled by the sensors 150,152. The value obtained by the sensor is subtracted from the value maintained in a table in memory which has therein the average value of a valid note for that particular point and that particular test. The absolute value of the difference between the sensed value and the average valid value stored is divided by eight and the result is squared. It will be appreciated that this is effectively the same as would be achieved by following equation 1, except that the final summation is effectively divided by sixty-four, rather than thirty-four (n). Of course, the result of the equation is effectively the same since each subresult is divided by the same value.

To conserve memory, if the result of the error squared overflows 16 memory bits, the result is set to a binary 255, which is the maximum value which might be stored in the allotted memory. If there is no overflow and if the arithmetic result is less than some value selected on the basis of analysis of a plurality of tests on valid papers, then the result is set to 0, indicating that there was substantially no error at that point on the paper for that particular test. It will be noted that the program calls for a value of "21" for this comparison, but, depending upon the currencies being tested and the test equation being used, the value will quite possibly be different. In any event, if the error lies between an overflow and the selected test value just discussed, the actual error is used as the result and added to the previous test results.

Figure 21:
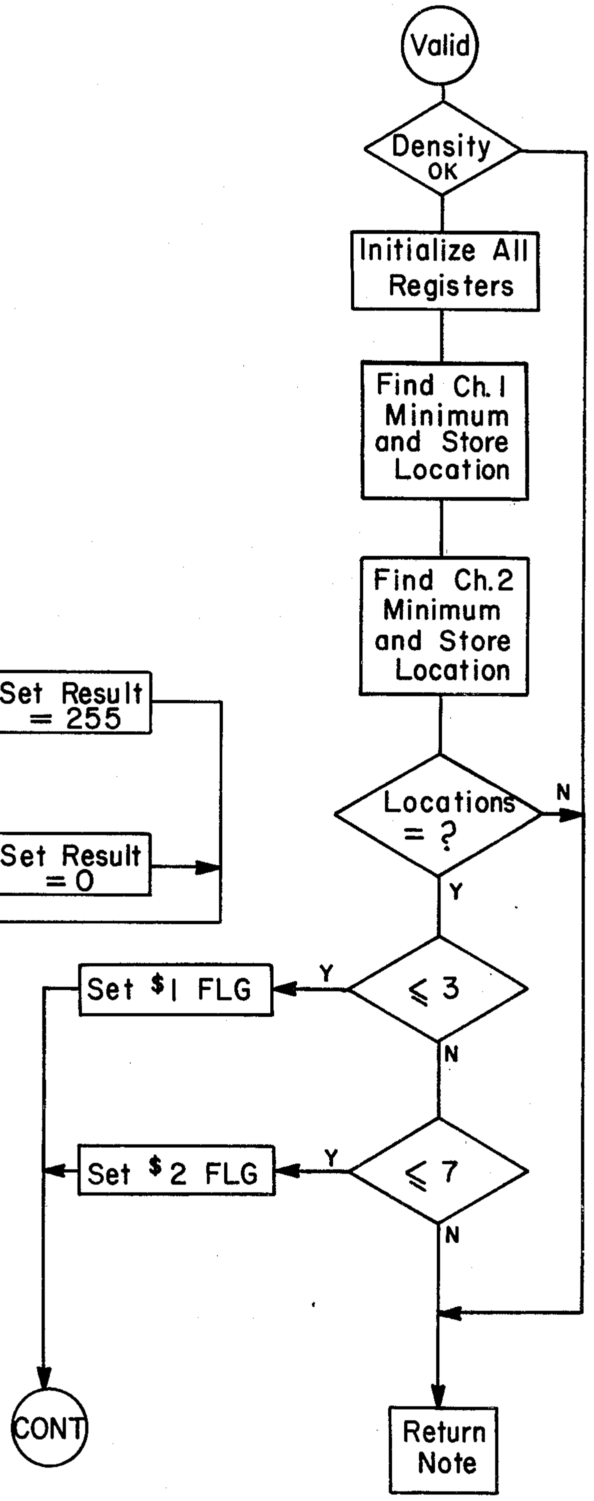
FIG. 21 is a flow chart of the VALIDITY subroutine of the control program for the invention.

FIG. 21 presents the program flow chart of the validity test indicated in FIG. 17. It will be noted that a determination is first made as to whether or not the density of the paper tendered is within the appropriate density range of valid notes. The sensing of these values was made by the density sensor 148. If the density is not of an acceptable value, the return subroutine is entered into. If the density is satisfactory, the registers are intialized to accept data relative to the minimum values sensed by the channel 1 sensor 150 and the channel 2 sensor 152. It will be appreciated that eight tests are run on each of the points sensed by each of the two sensors 150, 152. Accordingly, 16 registers are provided to receive the data as it is aggregated for each of the tests. There are eight registers provided for each channel, one register being provided for each test of that channel. If the register addresses are in the same order such that, for example, register 0 and 8 contain corresponding tests for the same note and the same posture of entry to the acceptor, and so on such that registers 7 and 15 correspond to a test for the same note and the same manner of deposit to the acceptor, then, for a valid note, the address of the register containing the minimum value for all of the channel 1 tests must equal the address of the register containing the minimum value of the channel 2 tests, less 8.

In other words, the flow chart of FIG. 21 determines whether or not the channel 1 and channel 2 tests were passed (minimum aggregate) in such a manner that both tests indicate the same note and the same mode of entry into the acceptor. If the tests do not agree, the note is returned. If the tests do agree, then a determination is made as to the value of the note offered by determining the addresses of the registers responding to the tests. For example, if the registers 0–3 were used for storing values for tests conducted to determine the validity of a $1.00 bill, and if the register location was less than or equal to 3, then the $1.00 flag would be set. Similarly, if registers 4–7 were used for the $2.00 tests, and if the address register were greater than 3 but less than or equal to 7, then the $2.00 flag would be set. The routine of FIG. 17 is then continued from the "Note Valid" box onward.

It will be appreciated that any of a number of mathematic equations may be utilized and tests may be conducted for any number of securities. By following the flow chart presented hereinabove and with sufficient memory available, any number of securities may be tested utilizing the structure and techniques of the instant invention. In each case, acquired data is compared with statistical data acquired from valid securities to determine the authenticity of the paper offered.

Thus it can be seen that the objects of the invention have been achieved by the structure and techniques presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention reference should be had to the following claims.

What is claimed is:

1. A note acceptor for receiving and determining the authenticity of a paper security such as a currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and first gate means within said note path closely adjacent a first end for selectively engaging and inhibiting the passage of the security along said note path, said first gate means including a plurality of aligned spaced-apart, positionally alternating slots in said top and bottom plates and spaced-apart, positionally alternating teeth positively driven into and withdrawn from said slots in straight line action.

2. The note acceptor according to claim 1 wherein said top and bottom plates are hingedly interconnected, said top plate opening from said bottom plate and exposing said note path.

3. The note acceptor according to claim 1 wherein said top rollers are spring-loaded against said bottom rollers.

4. The note acceptor according to claim 3 wherein said bottom rollers include resilient surfaces in contacting engagement with said top rollers.

5. The acceptor according to claim 1 wherein said note path begins at a slot defined between ends of said top and bottom plates, said note path including a horizontal portion extending from said slot and a vertical portion extending downward to a termination of said path, said note path including an inclined portion extending from said horizontal portion to an arc, said arc interconnecting said downward portion and encompassing more than 90°.

6. The acceptor according to claim 1 wherein said slots are chamfered.

7. The acceptor according to claim 1 wherein said first gate means further includes a photo sensor operatively connected thereby by a vane, said vane communicating to said photo sensor the state of actuation of said firt gate means.

8. The acceptor according to claim 1 which further includes second gate means at a second end of said note for preventing the return of the security along the note path after it has passed said second end.

9. The acceptor according to claim 8 wherein said second gate means comprises a pivotal gate having a cam surface depending therefrom and which further includes a plurality of tines maintained at the end of said bottom plate and in juxtaposition to said pivotal gate, said tines being alternately angled with respect to each other.

10. The acceptor according to claim 1 wherein said control means comprises a light chopper connected to and driven by said drive means.

11. The acceptor according to claim 10 wherein said light chopper produces output pulses of a frequency corresponding to the speed at which the note passes along said note path, and wherein said control means further includes counting means for receiving said pulses and enabling the acquisition of data by said sensing means at predetermined intervals.

12. The acceptor according to claim 1 wherein said control means comprises a free-wheeling roller in said note path caused to rotate by the paper moving thereover.

13. The method of determining the authenticity of a paper offered as a valid security, comprising:

scanning said paper along at least a first path and obtaining a plurality of test data at preselected points on said paper along said first path;

comparing said plurality of data with average values of data taken from known valid securities at said points;

accepting said paper as a valid security if the difference between said test data and said reference values is within a predetermined range; and wherein said step of comparing is according to the formula $$\frac{1}{n}\ \Sigma\ i=1\ Z_i\bar{Z}_i \text{ where } Z_i = \frac{X_i - \bar{X}}{\sigma}$$

and where $X_i$ is the value of data obtained from a specific area i, $\bar{X}$ is the average of all $X_i$'s, $\sigma$ is the standard deviation of all $X_i$'s on the paper, and $\bar{Z}_i$ is the average $Z_i$ for a valid paper.

14. The method according to claim 13 wherein said scanning step comprises moving the paper past at least one photodetector and obtaining an output from said photodetector at predetermined points along the paper.

15. The method according to claim 14 wherein the step of comparing includes comparing the said data taken at each said point with a plurality of reference values for each such point.

16. The method according to claim 14 which further includes the step of digitizing said plurality of data.

17. The method according to claim 13 which further includes the step of sensing the dimensions of the paper to determine its authenticity.

18. The method according to claim 13 which further includes the step of reciprocatingly moving the paper when movement of the paper along said path is restricted.

19. A note acceptor for receiving and determining the authenticity of a paper security such as a currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and gate means comprising a pivotal gate having a cam surface depending therefrom, said gate means further including a plurality of tines extending from the end of said bottom plate and in juxtaposition to said pivotal gate, said tines alternately angled upward, downward, and in alignment with said bottom plate.

20. The acceptor according to claim 19 wherein said second gate means includes a sensor emitting a signal indicative of the state of actuation of said pivotal gate.

21. The acceptor according to claim 19 wherein said gate means further includes first and second rollers in contacting engagement in alignment with said note path, said rollers being undirectionally rotatable.

22. The acceptor according to claim 21 wherein said first roller is constructed of a resilient material and said second roller is in deformable contacting engagement therewith.

23. The acceptor according to claim 21 wherein said note path begins at a slot defined between ends of said top and bottom plates and which further includes a receptacle having a top cover and a bottom escutcheon defining therebetween an opening in communication with said slot.

24. The acceptor according to claim 23 wherein said receptacle further includes a plurality of fingers spaced along each side of said opening, said fingers being received within mating slots in said top and bottom plates on each side of said slot.

25. The acceptor according to claim 24 wherein said fingers arcuately diverge from said opening and into said slot.

26. The acceptor according to claim 25 wherein said escutcheon and top cover are interconnected by side plates, said escutcheon being inclined and said top cover having a cut-out section toward said opening.

27. A note acceptor for receiving and determining the authenticity of a paper security such as currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and gate means for preventing the return of the security along the note path, comprising a rotatable drum having a slot passing therethrough in selective alignment with said note path.

28. A note acceptor for receiving and determining the authenticity of a paper security such as a currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and gate means for preventing the return of the security along the note path, comprising a reciprocating member having a plurality of slots passing therethrough in selective alignment with said note path.

29. A note acceptor for receiving and determining the authenticity of a paper security such as a currency, bank notes, and the like, comprising: p1 top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and anti-jamming means for reciprocatingly moving the paper in said note path.

30. A note acceptor for receiving and determining the authenticity of a paper security such as a currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities, according to the formula $$\frac{1}{n}\sum_{i=1} Z_i\overline{Z}_i \text{ where } Z_1 = \frac{X_i - \overline{X}}{\sigma} \text{ and}$$

where $X_i$ is the value of data obtained from a specific area i, $\overline{X}$ is the average of all $X_i$'s, $\sigma$ is the standard deviation of all $X_i$'s on the paper, and $\overline{Z}_i$ is the average Zi for a valid paper.

31. A note acceptor for receiving and determining the authenticity of a paper security such as a currency, bank notes, and the like, comprising:

top and bottom plates defining a note path therebetween for receiving a paper offered as a valid security;

paired top and bottom rollers respectively received by said top and bottom plates in contacting engagement within said note path;

drive means connected to and driving said bottom rollers;

sensing means interposed along said note path between said top and bottom plates for acquiring data from specific areas on said paper as it passes along said note path;

control means interconnecting said drive means and said sensing means for synchronizing the passing of said paper along said note path and the acquisition of data therefrom;

comparison means operatively connected to and receiving said data from said sensing means and determining the validity of the paper as a function of the difference between said data and reference values obtained from a plurality of valid securities; and wherein said sensing means includes a first photodetector circuit presenting an output signal corresponding to the density of the security itself as it passes along said note path, said sensing means further including second and third photodetector circuits emitting light to and receiving light from said security and presenting output signals corresponding to the light received, the output signals of said first, second, and third photodetector circuits being compared with respective reference signals, providing said data as a ratio between said output signals and said reference signals.

32. The acceptor according to claim 31 which further includes an analog to digital converter operatively connected to said first, second, and third photodetector circuits to said first, second, and third photodetector circuits and receiving and digitizing said data.

33. The acceptor according to claim 32 which further includes a multiplexer interposed between said photodetector circuits and said analog to digital converter.

* * * * *